(12) United States Patent
Yamamoto et al.

(10) Patent No.: US 6,463,864 B2
(45) Date of Patent: Oct. 15, 2002

(54) GASIFICATION MELTING FURNACE FOR WASTES AND GASIFICATION MELTING METHOD

(75) Inventors: Takaiku Yamamoto, Kashima; Hideyuki Yamaoka, Ibaraki; Yoshinori Matsukura, Kashima; Hirotaka Sato, Kashima; Katsuya Isaka, Kashima; Akio Mutsuta, Tokyo; Hiroaki Ishida, Kashima; Hitoshi Matsubara, Kashiwa; Tatsuo Nakashima; Takahiro Yano, both of Kashima; Noboru Furukawa, Chiba; Teruo Oowada, Ibaraki, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/911,693

(22) Filed: Jul. 25, 2001

(65) Prior Publication Data

US 2002/0033123 A1 Mar. 21, 2002

Related U.S. Application Data

(63) Continuation of application No. PCT/JP00/00343, filed on Jan. 25, 2000.

(30) Foreign Application Priority Data

Jan. 27, 1999 (JP) .............................. 11-018789
Feb. 22, 1999 (JP) .............................. 11-043660

(51) Int. Cl.$^7$ .............................. F23G 5/02; F23J 15/00; F23B 7/00
(52) U.S. Cl. ...................... 110/255; 110/235; 110/342; 110/346; 110/101 CD; 110/219; 110/203
(58) Field of Search .................... 110/220, 223, 110/224, 215, 217, 297, 342, 345, 344, 346, 101 CD, 219, 203, 204, 216, 235, 255, 259; 60/651, 671

(56) References Cited

U.S. PATENT DOCUMENTS

| | | | | |
|---|---|---|---|---|
| 3,648,629 A | * | 3/1972 | Southwick | 110/8 R |
| 3,744,438 A | * | 7/1973 | Southwick | 110/8 E |
| 3,858,534 A | * | 1/1975 | Berg | 110/8 R |

(List continued on next page.)

FOREIGN PATENT DOCUMENTS

| | | |
|---|---|---|
| JP | 2-150611 | 6/1990 |
| JP | 6-26626 | 2/1994 |
| JP | 9-60830 | 3/1997 |
| JP | 9-314100 | 12/1997 |
| JP | 10-148317 | 6/1998 |

*Primary Examiner*—Ira S. Lazarus
*Assistant Examiner*—K. B. Rinehart
(74) *Attorney, Agent, or Firm*—Armstrong, Westerman & Hattori, LLP

(57) ABSTRACT

A gasification and melting furnace for wastes has a vertically movable furnace center lance disposed along the axis of the furnace and adapted to blow off a combustion sustaining gas downward into the furnace. One or more stages of upper tuyeres are disposed so that the angle at which the combustion sustaining gas is blown off into the furnace is displaced from the furnace axis direction, and one or more stages of lower tuyeres projected into the furnace so as to blow off a combustion sustaining gas or both combustion sustaining gas and fuel toward the furnace axis. Formation of a low temperature region in the furnace are prevented and a fire spot is concentrated on the combustion of wastes. As a result, molten slag and various metals, as well as an energy gas, which are high in added value, can be recovered stably.

35 Claims, 9 Drawing Sheets

U.S. PATENT DOCUMENTS

| | | | | |
|---|---|---|---|---|
| 4,377,119 A | * | 3/1983 | Noack | 110/346 |
| 4,387,019 A | * | 6/1983 | Dale et al. | 209/12 |
| 4,423,702 A | * | 1/1984 | Ashworth et al. | 122/5 |
| 4,760,585 A | * | 7/1988 | Queiser et al. | 373/122 |
| 4,785,744 A | * | 11/1988 | Fontaine | 110/214 |
| 5,050,512 A | * | 9/1991 | Tratz et al. | 110/346 |
| 5,282,429 A | * | 2/1994 | Kato et al. | 110/344 |
| 5,799,596 A | * | 9/1998 | Peake | 110/345 |
| 6,032,467 A | * | 3/2000 | Oshita et al. | 60/651 |
| 6,152,306 A | * | 11/2000 | Miller | 209/3 |
| 6,161,490 A | * | 12/2000 | Fujinami et al. | 110/346 |
| 6,269,755 B1 | * | 8/2001 | Boswell et al. | 110/264 |
| 6,279,513 B1 | * | 8/2001 | Virr | 122/4 D |
| 6,283,048 B1 | * | 9/2001 | Fujinami et al. | 110/346 |

\* cited by examiner

GASIFICATION MELTING FURNACE FOR WASTES AND GASIFICATION MELTING METHOD This application is continuation of international application PCT/JP00/00343 filed on Jan. 25, 2000.

FIELD OF ART

The present invention relates to gasification and melting furnace and method for wastes wherein organic matters contained in municipal solid wastes and/or industrial solid wastes, which may be together referred to simply as "wastes" hereinafter, are gasified, then a gas (also referred to as "energy gas" hereinafter) employable as fuel is recovered, low-boiling metals contained in the wastes are recovered as dust, and ash and valuable metals (also referred to simply as "metals") contained in those wastes are recovered as molten slag and molten metals, respectively. Particularly, the invention is concerned with gasification and melting furnace and method permitting a stable operation over a long period.

As examples of wastes are included municipal refuses typical of which are garbages, plastic and iron scraps, shredder dusts of discarded automobiles and household appliances, bottom ash, and landfill wastes containing earth and sand.

BACKGROUND ART

In Japanese Patent Laid Open No. Hei 9-314100 there is disclosed a high-temperature reactor operating method for treating wastes.

The said high-temperature reactor operating method is characterized in that at least two oxygen lances are disposed below a wastes inlet in such a manner as to enhance the flow of molten waste and that at least two oxygen lances are disposed above the wastes inlet in such a manner as to obstruct the flow of rising gas components.

In the above publication, however, there is disclosed neither any concrete method nor any mode of embodiment about how to enhance the flow of molten waste and how to obstruct the flow of rising gas components.

The present inventors presume that introduced gases and gases resulting from decomposition of wastes form a rising flow to be discharged to the exterior of the system.

Thus, there is no such a downward flow as reinforces the flow of molten waste, but an upward flow is dominant. Likewise, there is no such flow as obstructs the flow of rising gas components, either. Therefore, it is difficult to artificially operate such a flow as obstructs the flow of rising gas components.

The present inventors think that the technique disclosed in the above publication is not clearly described and is based on principles contrary to the natural law and that therefore it is difficult to practice the said technique.

In Japanese Patent Laid Open No. Hei 10-148317 there are disclosed gasification and melting furnace and method wherein a series of steps comprising gasifying and melting wastes, dehydration and thermal decomposition, and reforming the resulting gas (indicating reforming up to CO, $CO_2$, $H_2$, and $H_2O$) can be carried out in a single furnace without using the expensive coke and which can produce a clean energy gas not containing tar or dioxin. The gasification and melting furnace and method disclosed in the above publication is hereinafter referred to as the prior art.

The prior art relates to a gasification and melting technique for wastes using as a basic configuration a furnace which is provided at an upper portion thereof with both wastes inlet and gas outlet, also provided at a lower portion thereof with a molten slag/metal outlet, and further provided intermediate between the upper and lower portions with plural stages of tuyeres permitting a combustion sustaining gas and fuel to be independently blown off therethrough into the furnace. Further, as a development from the basic configuration the prior art is concerned with a gasification and melting technique for wastes which includes lances disposed in upper positions and capable of moving vertically toward the interior of the furnace and blowing off a combustion sustaining gas and fuel each independently, means for measuring the position of wastes introduced into the furnace, means for measuring the temperature of a middle portion, and means for measuring the temperature of an upper portion. This conventional technique is for separating wastes into an energy gas containing CO and $H_2$ as main components, as well as molten slag and metals.

However, having tuyeres or lances for blowing off a combustion sustaining gas and fuel each independently give rise to problems such that at the time of blowing off fuel from a tuyere or a lance there is formed a low temperature region within the furnace due to an endothermic reaction induced by a thermal decomposition of hydrocarbons contained in the fuel, or in the case of a solid fuel the temperature is also reduced by a carrier gas used for blowing off the fuel. Even in the case where a solid or liquid fuel is not blown off into the furnace, it is necessary that a purge gas be allowed to flow constantly for preventing a fuel feed pipe from being clogged. Consequently, a low temperature region is formed in part of a fire spot and melting of slag and metal components contained in a thermal decomposition residue becomes unstable at an area below that low temperature region, thus making it impossible to effect a stable operation.

For preventing the occurrence of such a low temperature region it has so far been necessary to blow off not only fuel but also a combustion sustaining gas necessary for the combustion of the fuel. As a result, the amount of the combustion sustaining gas used per unit volume of wastes treated increases and the process efficiency is deteriorated.

DISCLOSURE OF THE INVENTION

It is an object of the present invention to provide a method and apparatus capable of preventing the occurrence of a low temperature region in a gasification and melting furnace, concentrating a fire spot for the combustion of wastes and thereby stably recovering molten slag and various metals, as well as an energy gas, which are high in added value.

Having repeated tests in a gasification and melting furnace, the prevent inventors became aware of the following points (A) to (E).

(A) As to a lance disposed at the center of the furnace, it is not only unnecessary but also detrimental to provide equipment for blowing off a combustion sustaining gas and fuel each independently.

Regarding LPG and LNG used as gas fuels and petroleum used as a liquid fuel, they themselves contain much hydrocarbons and hydrogen, so due to an endothermic reaction caused by thermal decomposition a low temperature region is formed in part of a fire spot even if a combustion sustaining gas is fed simultaneously with the introduction of fuel. Melting of slag and metal components contained in a thermal decomposition residue present below the fire spot becomes unstable due to the drop in temperature of the fire spot, with consequent formation of an unmelted portion or a re-solidified portion. Thus, a melting region is not formed stably and the flowing-down of melt becomes intermittent, resulting in that the furnace operation becomes unstable. When blowing off a solid fuel, it is necessary to use a carrier gas which is not combustion-sustainable, and this carrier gas strikes concentratively against an upper-end surface of wastes introduced into the furnace and promotes the cooling action, so that the furnace operation becomes still more unstable.

(B) Also as to an upper tuyere, like the furnace center lance, it is not necessary to blow off fuel because it is intended to reform and burn the gas resulting from thermal decomposition of the wastes.

(C) By disposing the furnace center lance along a central axis (also referred to as "furnace axis" hereinafter) of the furnace it is made possible to melt the wastes concentratively at the central portion of the furnace and hence the furnace operation becomes extremely stable. Besides, by melting the wastes concentratively at a fire spot portion, a high temperature region is spaced apart from the furnace side wall and hence it is possible to prevent the furnace refractory from locally becoming high in temperature, so that the durability of the furnace refractory can be improved to a remarkable extent.

For melting the wastes concentratively at the central portion of the furnace it is important to control the position of an upper end surface of the wastes (also referred to as "introduced wastes"hereinafter) introduced into the furnace. Particularly, for ensuring a stable operation it is important to measure the position of an upper end portion of the introduced wastes and control the upper end portion of the introduced wastes to a proper position.

In newly developing a device for measuring the position of an upper end face of the introduced wastes the present inventors became aware of the following points (a) to (c).

(a) Above the introduced waste, as a pipe is brought down while allowing a certain pressure of gas to be blown off from a lower end of the pipe, an upper end surface of the introduced wastes and the lower end of the pipe come into contact with each other, so that the lower end of the pipe is closed with the introduced wastes and the internal gas pressure of the pipe increases rapidly.

(b) If a relation between the distance of movement of the pipe and the position of the introduced wastes is determined in advance, the position of the introduced wastes can be determined from the distance of movement of the pipe at which distance there occurs an abrupt change in internal gas pressure of the pipe.

(c) Instead of the method wherein the lower end of the pipe is closed directly with the introduced wastes there can be adopted a method wherein the lower end of the pipe is closed indirectly with a top-shaped member attached to the pipe lower end and capable of freely moving vertically.

By the application of the above knowledges it is possible to easily measure the position of an upper end surface of the introduced wastes.

(D) As to an upper tuyere, by installing it so that the angle at which a combustion sustaining gas is blown off is displaced from the furnace axis direction, the flow of the combustion sustaining gas from the furnace center lance is not disturbed, so that a fire spot is formed stably at the same position and the effect of installation of the furnace center lance can be exhibited to the utmost extent. Additionally, the following effects can also be obtained.

Since the combustion sustaining gas from the upper tuyere does not directly strike against the furnace center lance, the refractory of the furnace center lance can be greatly improved in its durability.

By blowing off the combustion sustaining gas from the upper tuyere deviatedly from the furnace axis it is possible to let intra-furnace produced gas to circle and hence possible to accelerate mixing and the reforming reaction.

Dust contained in the gas is moved toward the furnace wall, thereby promoting the adhesion of dust to the furnace wall, the durability of the furnace can be improved remarkably by a self-coating action.

The amount of dust discharged from the gas outlet can be decreased, whereby the wastes treatment yield can be improved and the load on a dust remover can be diminished.

(E) By projecting a lower tuyere in the furnace axis direction, a combustion space formed by the lower tuyere and a melt flow-down zone from a fire spot formed by the furnace center lance can be brought into contact with each other. Thus, the effect of the above (c) can be exhibited to a greater extent.

The present invention has been accomplished on the basis of the above knowledges (A) to (E) and the gist thereof is as mentioned in the following (1) to (4). (1) A vertical gasification and melting furnace for wastes wherein wastes are burnt, organic matters contained in the wastes are gasified and recovered as an energy gas, and at the same time ash and metals contained in the wastes are recovered as melts, the furnace including a gas outlet, a molten slag/metal outlet, a wastes inlet, a furnace center lance, an upper tuyere, a lower tuyere, a position measuring device for measuring the position of an upper end surface of wastes introduced into the furnace, and an intra-furnace temperature measuring device, the gas outlet being formed in an upper portion of the furnace, the molten slag/metal outlet being formed in a lower portion of the furnace, the wastes inlet being formed in a position between the molten slag/metal outlet and the gas outlet, the furnace center lance being disposed in the upper portion of the furnace vertically movably along the axis of the furnace so as to blow off a combustion sustaining gas downward into the furnace, the upper tuyere being disposed at one or more stages in a furnace wall portion positioned between the wastes inlet and the gas outlet so that the angle at which the combustion sustaining gas is blown off is displaced from the furnace axis direction, and the lower tuyere being disposed at one or more stages in a furnace wall portion positioned between the wastes inlet and the molten slag/metal outlet and being projected into the furnace in a direction in which the combustion sustaining gas or both combustion sustaining gas and fuel blown off toward the furnace axis.

By using the above gasification and melting furnace for wastes (1) it is possible to prevent the occurrence of a low temperature region in the furnace and concentrate a fire spot for the combustion of wastes. As a result, molten slag and various metals, as well as an energy gas, which are high in added value, can be recovered stably.

(2) The above gasification and melting furnace wherein the position measuring device for measuring an upper end surface position of the wastes introduced into the furnace is provided with a pipe, a portion for blowing off a certain pressure of gas from a lower end of the pipe to the exterior of the pipe, a measuring instrument for measuring an internal pressure of the pipe, and a device for moving the pipe vertically.

By installing the above position measuring device (2) as the device for measuring an upper end surface position of the introduced wastes in the gasification and melting furnace (1), the accuracy in measuring an upper end surface position of the introduced wastes can be improved. As a result, molten slag and various metals, as well as an energy gas, which are high in added value, can be recovered in a more stable manner.

(3) A gasification and melting method for wastes using the above gasification and melting furnace (1), which method comprises introducing wastes into the furnace from the wastes inlet, allowing an upper end of the introduced wastes to be formed at a position above an upper end of a tuyere located at the top stage of the lower tuyeres and below a lower end of the wastes inlet, blowing off a combustion sustaining gas into the furnace from the furnace center lance and the upper tuyeres, blowing off a combustion sustaining gas or both combustion sustaining gas and fuel into the furnace from the lower tuyeres, allowing the introduced wastes to burn, holding the temperature of an upper end surface of the introduced wastes at 60° C. or higher, holding the temperature of a fire spot at which a main flow of the combustion sustaining gas blown off from the furnace center lance strikes against the wastes' surface, at 2000° C. or higher, holding the gas present above the wastes inlet in the furnace at a temperature in the range of 1000° C. to 1400° C. and discharging it from the gas outlet, and discharging molten slag which contains molten inorganic oxides and metals, as well as molten metals, from the molten slag/metal outlet.

If the above gasification and melting method for wastes (3) is carried out using the above gasification and melting furnace (1), it is possible to stably recover molten slag and various metals, as well as an energy gas, which are high in added value.

(4) The above gasification and melting method (3) wherein control is made by vertical movement of the furnace center lance so that the diameter, df, of the fire spot formed by the furnace center lance and the inside diameter, D, of the furnace are in a relation of $df/D \leq 0.6$.

If the above gasification and melting method (4) is carried out in addition to the above method (3), the fire spot for burning the wastes can be further concentrated. As a result, molten slag and various metals, as well as an energy gas, which are high in added value, can be recovered more stably.

BRIEF DESCRIPTION OF THE DRAWINGS

FIGS. 2A and 2B are conceptual diagrams showing an example of a method for using a position measuring device for measuring the position of wastes introduced into the furnace, of which FIG. 2A shows a state in which a pipe is not in contact with an upper end surface of the introduced wastes and FIG. 2B shows a state in which the pipe is in contact with the upper end surface of the introduced wastes;

FIGS. 3A and 3B are conceptual diagrams showing another example of a method for using a position measuring device for measuring the position of wastes introduced into the furnace, of which FIG. 3A shows a state in which a top-shaped member is not in contact with an upper end surface of the introduced wastes and FIG. 3B shows a state in which the top-shaped member is in contact with the upper end surface of the introduced wastes;

BEST MODE FOR CARRYING OUT THE INVENTION

A configuration example of an apparatus for practicing the present invention, as well as a method using the apparatus, is described below with reference to FIG. 1.

Figure 1:
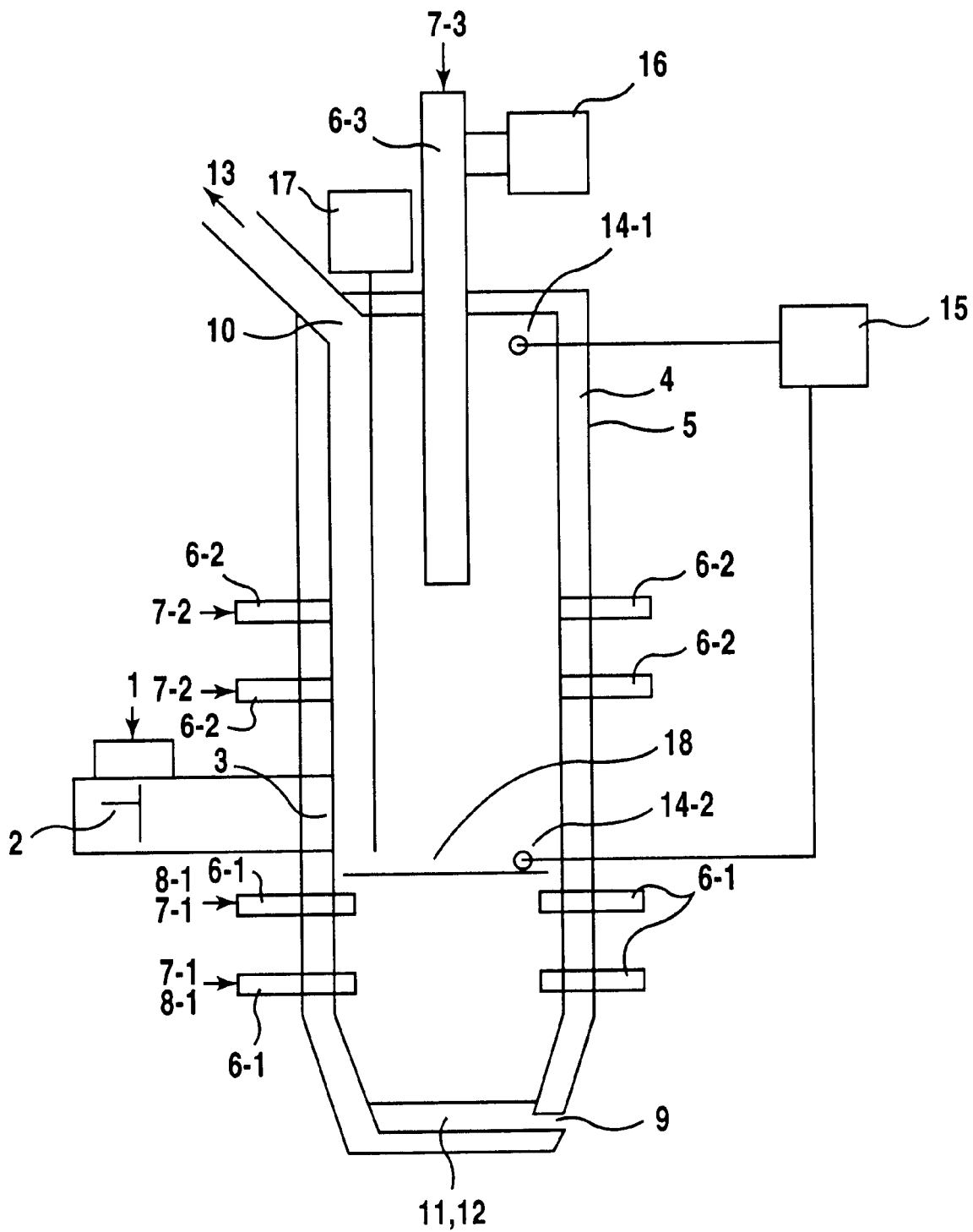
FIG. 1 is a schematic diagram showing a configuration example of a gasification and melting furnace for wastes according to the present invention.

FIG. 1 is a schematic diagram for explaining a configuration example of a gasification and melting furnace for wastes according to the present invention. As shown in the same figure, a gasification and melting furnace 5 for wastes is lined with a lining refractory 4 and is provided with a wastes inlet 3 for introducing wastes 1 into the furnace and a gas outlet 10 for the discharge of produced energy gas (also referred to as "discharged gas" hereinafter) and dust. A pusher 2 is attached to the wastes inlet 3. Further, a molten slag/metal outlet 9 for discharging molten slag 11 (also referred to simply as "slag" hereinafter) and molten metal 12 (also referred to simply as "metal" hereinafter) to the exterior of the furnace is formed in a lower portion of the furnace.

Successively from the lower portion of the furnace, lower tuyeres 6-1 for blowing off a combustion sustaining gas 7-1 or both combustion sustaining gas 7-1 and fuel 8-1 into the furnace, and upper tuyeres 6-2 for blowing off a combustion sustaining gas 7-2 into the furnace, are formed in side face positions of the furnace. Further, a furnace center lance 6-3 for flowing off a combustion sustaining gas 7-3 into the furnace is installed in the upper portion of the furnace along a central axis of the furnace.

The combustion sustaining gas indicates oxygen or an oxygen-containing gas, and the fuel indicates a gaseous fuel such as LPG or LNG, a liquid fuel such as heavy oil, or a solid fuel such as pulverized coal.

The furnace center lance 6-3 can be moved vertically by means of a lift mechanism 16.

The upper tuyeres 6-2 are installed so that the angle at which the combustion sustaining gas is blown off into the furnace is displaced from the furnace axis direction, while the lower tuyeres 6-1 are projected inwards toward the furnace axis with respect to the furnace wall.

Gasification and melting of wastes are carried out in accordance with the procedure of the following (A) to (E) using the above gasification and melting furnace:

(A) Wastes 1 are pushed into the furnace through the wastes inlet 3 by means of the pusher 2 and control is made so that an upper end surface 18 of the wastes thus introduced is positioned above the upper end of the lower tuyeres 6-1 located at the higher stage out of the lower tuyeres and below the lower end of the wastes inlet 3.

As to a position measuring device for measuring an upper end surface position of the introduced wastes, it is preferable to use one of the device examples shown in FIGS. 2A, 2B and FIGS. 3A, 3B, respectively.

Figure 2A:
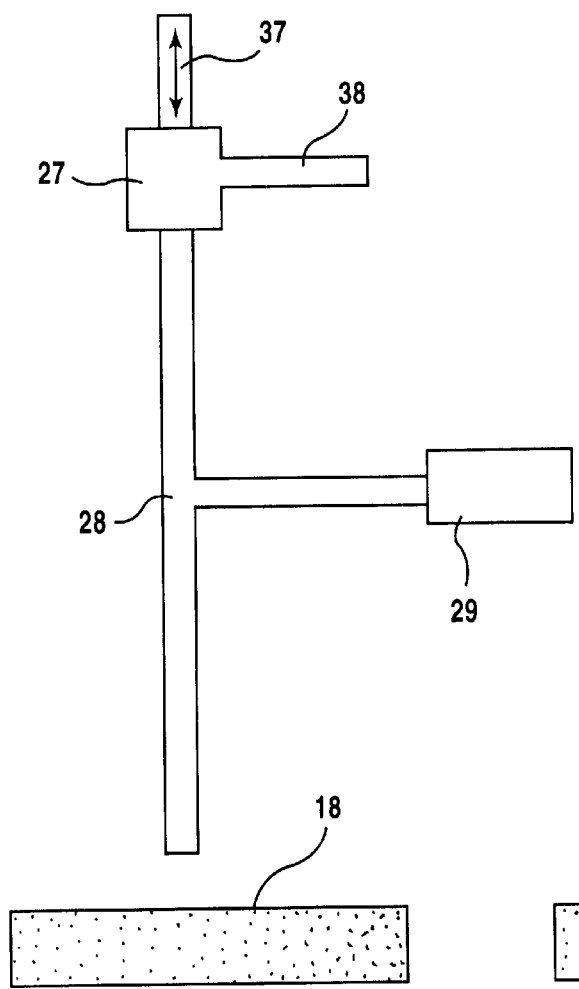
Figure 2B:
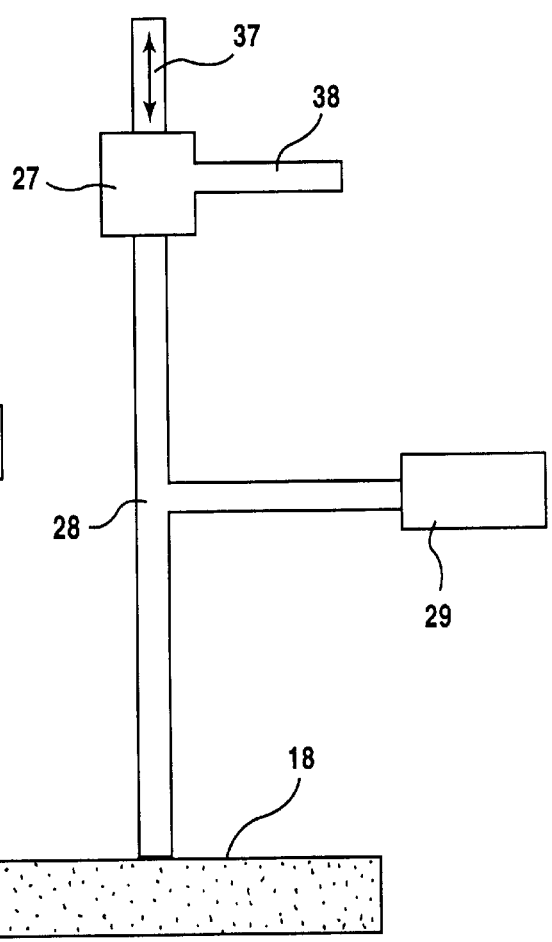

FIGS. 2A and 2B are conceptual diagrams showing an example of how to use a position measuring device for the introduced wastes, of which FIG. 2A shows a state in which a pipe is not in contact with an upper end surface of the introduced wastes, while FIG. 2B shows a state in which the pipe is in contact with the upper end surface of the introduced wastes.

As shown in FIGS. 2A and 2B, gas is fed through a gas inlet pipe 38, then is regulated to a predetermined certain pressure by means of a pressure regulating valve 27 and is blown off from a lower end of a pipe 28. In this state, the pipe 28 is brought down by a lift device 37, and when an opening in the lower end of the pipe 28 comes into contact with the upper end surface 18 of the introduced wastes, there no longer is any space for the escape of gas to be discharged, so that the internal pressure of the pipe increases, which pressure increase can be measured with a pressure gauge 29. From the distance of movement of the pipe which distance corresponds to an abrupt change of the pressure it is possible to determine the position of the introduced wastes.

Figure 3A:
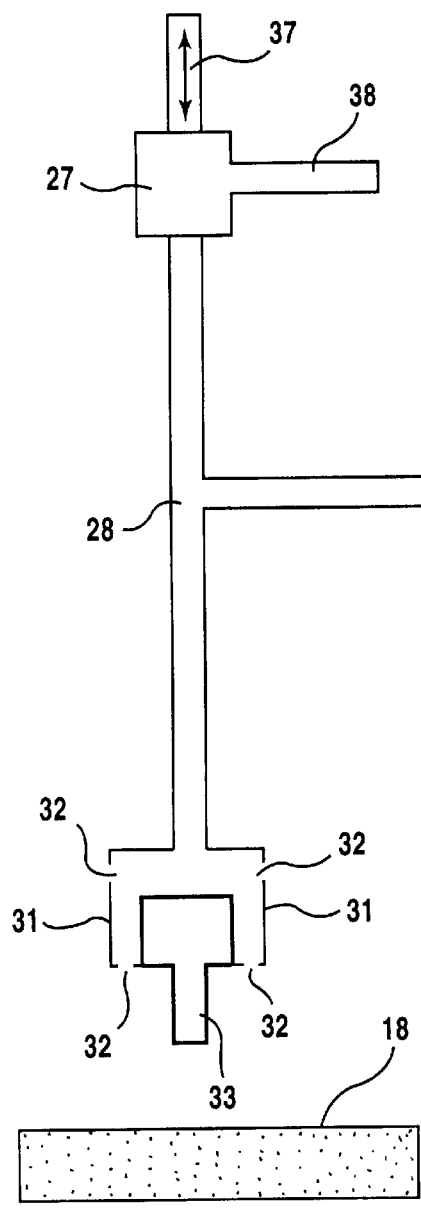
Figure 3B:
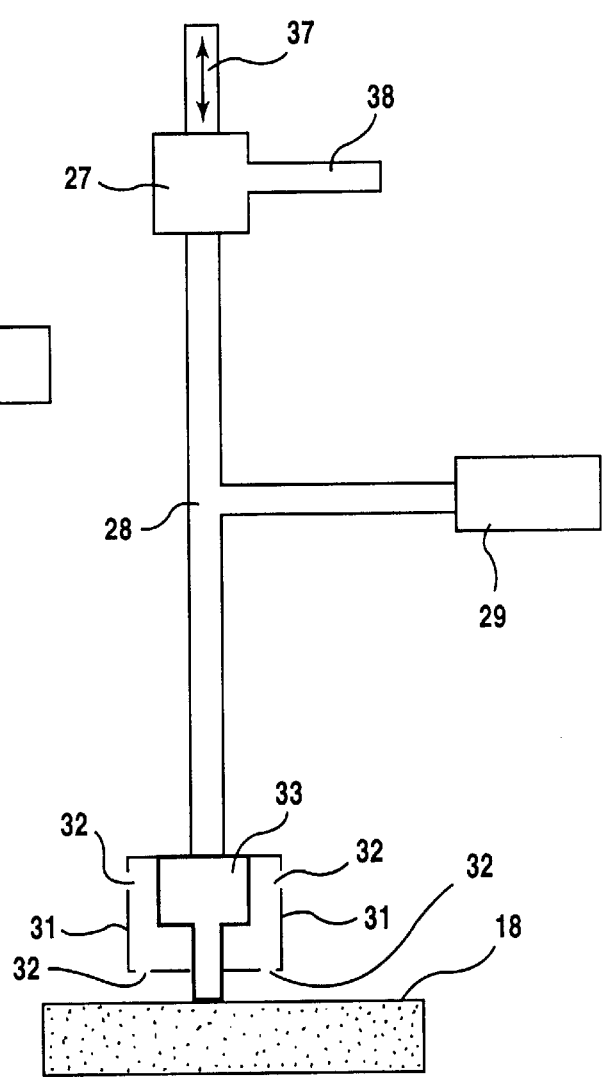

FIGS. 3A and 3B are conceptual diagrams showing another example of how to use a position measuring device for the introduced wastes, of which FIG. 3A illustrates a state in which a top-shaped member is not in contact with an upper end surface of the introduced wastes and FIG. 3B illustrates a state in which the top-shaped member is in contact with the upper end surface of the introduced wastes.

As shown in FIGS. 3A and 3B, gas is fed through a gas inlet pipe 38, then is regulated to a predetermined certain pressure by means of a pressure regulating valve 27 and is blown off from a lower end of a pipe 28. In this state, the pipe 28 is brought down by a lift device 37, and when a top-shaped member 33 comes into contact with an upper end surface 18 of the introduced wastes, the lower end of the pipe 28 is closed indirectly by the top-shaped member 33 which is held by a pipe 31 of a large diameter, the pipe 31 being connected to the lower end of the pipe 28 and having an opening 32 whose inside diameter is larger than that of the pipe 28, so that there no longer is any space for the escape of exhaust gas and the internal pressure of the pipe 28 can be measured with a pressure gauge 29. From the distance of movement of the pipe corresponding to an abrupt change in pressure it is possible to determine the position of the introduced wastes. In the state in which the top-shaped member is not in contact with the upper end surface 18 of the introduced wastes, the top-shaped member, with both the pressure of gas blown off from the overlying pipe 28 and gravity, is held at a position shifted to the lower end of the large-diameter pipe 31 larger in inside diameter than the pipe 28. In this state the gas pressure within the pipe 28 does not change.

Preferably, the inside diameter of the pipe 28 used in the above first or second apparatus is in the range of 1 to 10 mm. The material of the pipe 28 need not particularly be heat-resistant because the pipe is cooled with gas. The pipe 28 preferably has a length not causing pressure loss. It suffices for the pipe length to be in the range of 0.3 mm to 5 m.

As means for blowing off a certain pressure of gas to the exterior of the pipe there is used the pressure regulating valve 27, and the gas inlet pipe 38 is used for introducing gas into the pressure regulating valve 27.

As the device for measuring the internal pressure of the pipe, a device capable of measuring pressure changes will do. As to the gas to be used, an inert gas such as $N_2$ or Ar is preferred.

As the device for moving the pipe up and down, any device capable of moving up and down at a speed in the range of 0.1 to 1 m/S is employable. For example, a cable cylinder may be used.

As to the material of the large-diameter pipe 31 connected to the lower end of the pipe 28 and having an inside diameter larger than that of the pipe 28, a heat-resisting material is preferred. For example, steel or stainless steel is used. Preferably, the inside diameter of the large-diameter pipe 31 is in the range of twice to ten times as large as the inside diameter of the overlying pipe. The size of the opening 32 of the large-diameter pipe 31 is not specially limited if only it does not cause pressure loss.

As to the size of the top-shaped member 33, it is preferable that an upper portion thereof is in the range of 1.5 to 9 times as large as the pipe inside diameter and that a lower portion thereof is in the range of 1 to 8 times as large as the pipe inside diameter. The material thereof is preferably a heat-resisting material; for example, stainless steel is preferred.

As means for enlarging the lower contact area of the top-shaped member 33 and thereby stabilizing the position thereof, an attachment such as a disc or the like may be connected to the lower portion of the top-shaped member 33.

(B) A combustion sustaining gas is blown off into the furnace from the furnace center lance 6-3 and the upper tuyeres 6-2 and a combustion sustaining gas or both combustion sustaining gas and fuel are blown off into the furnace from the lower tuyeres 6-1, causing the introduced wastes 1 to burn, and the wastes are decomposed thermally by raising the upper end surface temperature of the introduced wastes to a high temperature of not lower than 60° C.

(C) Limestone or the like is added as necessary to the wastes to lower the viscosity of molten slag 11 and permit the molten slag to be discharged smoothly to the exterior of the furnace.

(D) The combustion sustaining gas 7-3 is blown off against the upper end surface 18 of the introduced wastes 1 through the furnace center lance 6-3, and at a fire spot at which a main flow (a flow formed toward the fire spot) of the combustion sustaining gas 7-3 from the furnace center lance 6-3 strikes against the wastes' surface, carbon as a thermal decomposition residue is mainly allowed to burn for conversion into CO. The heat of this combustion raises the fire spot temperature to 2000° C. or higher, whereby the thermal decomposition residue is heated and molten slag and metal are produced from the residue.

(E) Outside the main flow of the combustion sustaining gas 7-3 from the furnace center lance 6-3, a combustible gas which contains hydrocarbons resulting from the thermal decomposition of the wastes 1 and a combustible gas resulting from the combustion at the fire spot formed by the furnace center lance 6-3 are burnt by a tributary flow (a flow other than the main flow which constitutes the fire spot) of the combustion sustaining gas 7-3 blown off from the furnace center lance 6-3 and also by the combustion sustaining gas 7-2 blown off from the upper tuyeres 6-2, allowing the hydrocarbon gas to be reformed up to CO, $CO_2$, $H_2$, and $H_2O$ and discharged from the gas outlet 10 while controlling the ambient gas temperature to a temperature in the range of 1000° C. to 1400° C.

The following description is now provided about the positions where the tuyeres and lance are installed, as well as required functions thereof. The reason why the furnace center lance 6-3 is positioned on the furnace axis is that by so doing the melting of wastes can be carried out concentratively at the central portion of the furnace and that therefore the furnace operation is extremely stabilized. Besides, since the melting of wastes is effected concentratively at the fire spot portion, a high temperature portion is spaced away from the furnace side wall, whereby the furnace refractory can be prevented from becoming high in temperature locally and therefore the durability of the furnace refractory can be improved remarkably.

The degree of fire spot concentration attained by blowing off the combustion sustaining gas 7-3 from the furnace center lance 6-3 is adjusted by adjusting the distance between the position of the upper end surface 18 of the introduced wastes and the tip of the furnace center lance 6-3 on the basis of data obtained by a position measuring device 17 which measures the position of the upper end surface 18 of the introduced wastes. It is therefore necessary that the furnace center lance 6-3 be movable vertically.

The reason why the furnace center lance 6-3 does not require any equipment for blowing off fuel is that the purpose of using the furnace center lance resides in burning the upper end surface 18 of the introduced wastes at the fire spot and reforming thermally decomposed components in the upper portion of the furnace and that it is thus unnecessary to blow off fuel into the furnace.

That the furnace center lance has a fuel blowing-off equipment is not only unnecessary but also detrimental.

The reason is that LPG and LNG used as gas fuel and petroleum as liquid fuel themselves contain much hydrocarbons and hydrogen and that therefore a low temperature region is formed in part of the fire spot due to an endothermic reaction induced by thermal decomposition. As a result of lowering in temperature of the fire spot, the melting of slag and metal components contained in the thermal decomposition reside which underlies the fire spot becomes unstable, an unmelted or re-solidified portion is formed, a melted region is not stably formed, the flowing-down of the resulting melt becomes intermittent, and the furnace becomes unstable. At the time of blowing off a solid fuel into the furnace, it is necessary to use a carrier gas which is not a combustion sustaining gas, so that the carrier gas strikes concentratively against the upper end surface of the introduced wastes, promoting the cooling action and making the furnace still more unstable.

The reason why the upper tuyeres 6-2 are needed in addition to the furnace center lance 6-3 which plays the roll of fire spot position control is that it is intended to control the temperature in the upper portion of the furnace.

More particularly, the upper tuyeres 6-2 are necessary for reforming and secondary combustion at a predetermined temperature of hydrocarbons produced from the introduced wastes. By maintaining the temperature at the said predetermined temperature it is possible to decompose harmful components such as dioxin completely.

As a measuring instrument for permitting an accurate execution of the above operation it is necessary to use a thermometer within the furnace (a thermocouple 14-1 disposed in the upper portion within the furnace and a thermocouple 14-2 disposed below the wastes inlet).

The reason why the angle at which the combustion sustaining gas is blown off into the furnace from the upper tuyeres 6-2 is displaced from the furnace axis direction is that it is intended not to disturb the main flow (a fire spot forming flow) of the combustion sustaining gas blown off from the furnace center lance 6-3.

By so doing, the effect of concentrating the combustion sustaining gas from the furnace center lance 6-3 to the fire spot can be exhibited to the utmost extent. Since the combustion sustaining gas from the upper tuyeres 6-2 does not directly strike against the furnace center lance 6-3, the durability of the furnace center lance can be improved.

Since the angle at which the combustion sustaining gas is blown off into the furnace from the upper tuyeres 6-2 is displaced from the furnace axis direction, there is created an effect of causing the gas produced from the introduced wastes to circle and hence it is possible to prolong the retention time of the gas, that is, the reaction efficiency in reforming and secondary combustion can be improved. Further, the dust contained in the gas produced from the introduced wastes is directed toward the furnace wall 5 and thus the adhesion of dust to the furnace wall is promoted. Consequently, the durability of the furnace can be improved remarkably by a self-coating action. It is possible to decrease the amount of dust discharged from the gas outlet 10 and hence improve the wastes treatment yield and diminish the load on the dust remover.

The reason why the upper tuyeres 6-2 do not require any equipment for blowing off fuel into the furnace is that reforming and combustion of thermally decomposed components from the wastes are intended and that therefore it is not necessary to blow off fuel into the furnace as is the case with the furnace center lance 6-3.

In the position lower than the upper end surface 18 of the introduced wastes, carbon contained in the thermal decomposition residue of the wastes is burnt by blowing off the combustion sustaining gas 7-1 or both combustion sustaining gas 7-1 and fuel 8-1 into the furnace from the lower tuyeres 6-1, then inorganic oxides and metals contained in the residue are melted with the resulting heat at a position below the fire spot level defined by the furnace center lance 6-3 and closer to the furnace center than the position defined by the projection length of the lower tuyeres 6-1 and are discharged as molten slag 11 and molten metal 12 from the molten slag/metal outlet 9.

The reason why the combustion sustaining gas 7-1 or both combustion sustaining gas 7-1 and fuel 8-1 are blown off into the furnace from the lower tuyere 6-1 is as follows.

The reason why the combustion sustaining gas 7-1 is blown off into the furnace from the lower tuyeres 6-1 is that the carbon in the waste residue heated to a high temperature at the fire spot is caused to burn and that the heat of the combustion is effective in melting ash and metals contained in the residue. However, the components contained in the wastes are not constant but are heterogeneous in many cases and in some case carbon may not be contained in the thermal decomposition residue. In such a case, by blowing off fuel into the furnace in addition to the combustion sustaining gas, allowing combustion to take place, it is possible to avoid the occurrence of a trouble such that the temperature observed in front of the lower tuyeres 6-1 drops and ignition fails to take place due to a low temperature.

The reason why the tips of the lower tuyeres 6-1 are projected into the furnace is that the tips of the lower tuyeres 6-1 are to be spaced apart from the furnace wall 5 for preventing the furnace wall 5 from being damaged by the high-temperature gas which would cause a great deterioration of the furnace durability. Preferably, the lower tuyeres 6-1 are disposed so as to project 100 mm or more into the furnace. It has turned out that in a practical furnace the projection length of the lower tuyeres is independent of the furnace diameter. The "practical furnace" indicates a furnace which can treat about two tons or more of wastes a day in terms of garbages.

By allowing a high-temperature fire spot on the upper end surface of the introduced wastes concentratively at the furnace center with use of the furnace center lance 6-3 and by combining combustion and melting in front of the lower tuyeres 6-1 projecting into the furnace, a concentrative melting region can be formed and a stream of molten slag and metal capable of conducting molten slag and metal stably to the molten slag/metal outlet can be created.

In the case where the lower tuyeres 6-1 are not projected but are installed so as to form a melting region expanding throughout the whole furnace section, a concentrative stream of molten slat is not formed and thus, for conducting molten slag and metal stably to the molten slag/metal outlet, it is necessary to use a spacer such as coke. For this reason it is essential that the lower tuyeres 6-1 be projected into the furnace in combination with the furnace center lance 6-3.

Figure 4:
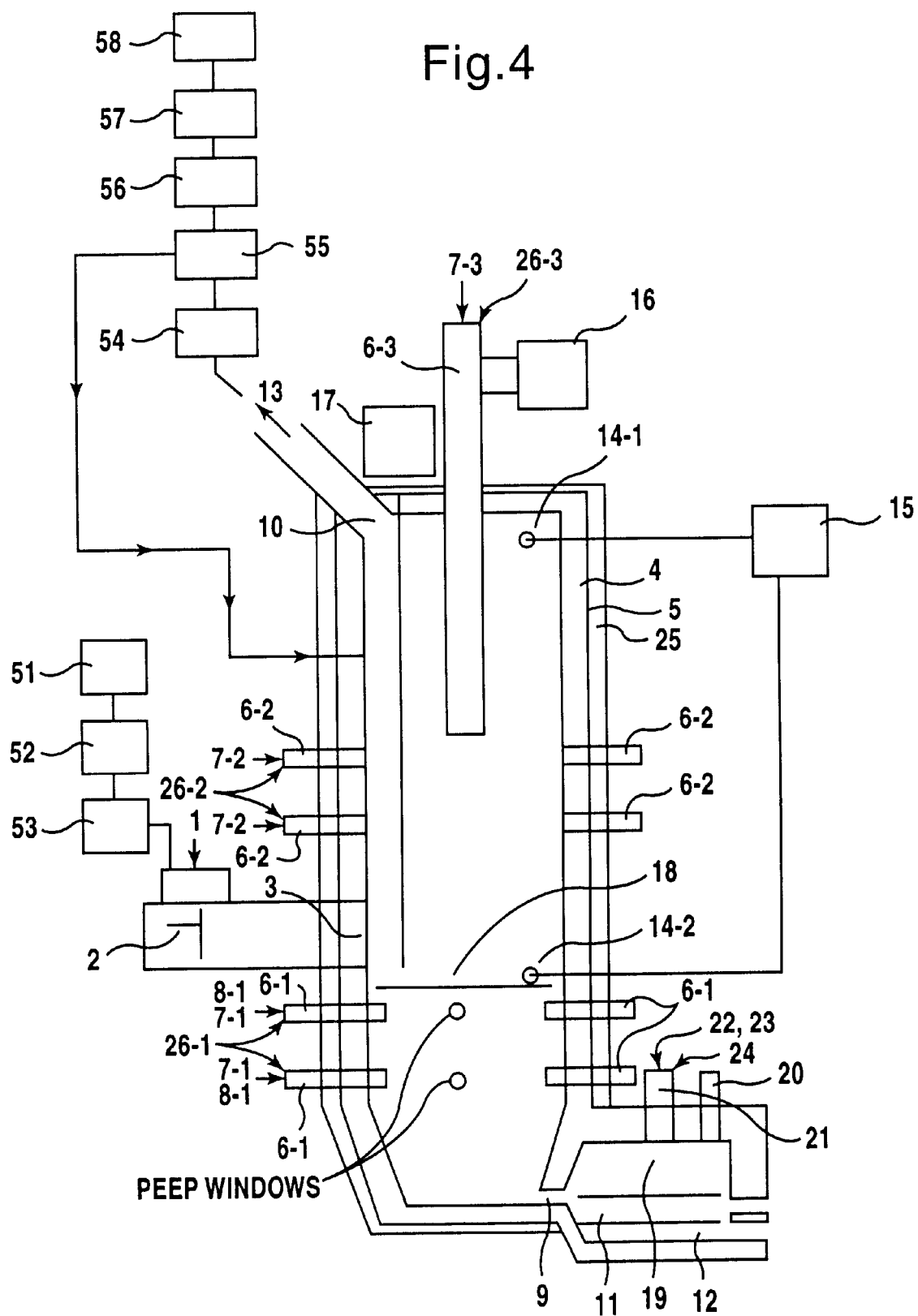
FIG. 4 is a schematic diagram showing another configuration example of a gasification and melting furnace according to the present invention.

FIG. 4 is a schematic diagram for explaining preferred modes.

With reference to FIG. 4, a description is given of the following preferred modes (1) to (28).

(1) Having a pool of molten slag and metal as equipment which follows the molten slag/metal outlet:

As shown in FIG. 4, a pool 19 of molten slag and metal is attached to the furnace, the pool 19 being provided in the interior thereof with a space capable of once storing therein the molten slag 11 and molten metal 12 before discharging them to the exterior of the furnace.

Components of molten slag vary with a change in components of introduced wastes, but slag components greatly dominate the fluidity of molten slag and metal, i.e., slag-off performance, and can be a factor which dominate the furnace stability. But by providing the pool of molten slag and metal the furnace interior is maintained in a dry hearth state (a state in which molten slag 11 and molten metal 12 do not stay in the furnace bottom), and by mixing of slag in the molten slag/metal pool 19 it is possible to also absorb a change in components of the slag itself.

Although the molten slag 11 and molten metal 12 are mixed in the melt discharged from the molten slag/metal outlet 9, they can be separated from each other easily by a difference in specific gravity.

Molten slag 11 small in specific gravity and molten metal 12 large in specific gravity can be easily separated from each other because the former stays in an upper portion and the latter stays in a lower portion. If plural outlets are provided correspondingly to the respective positions, it is possible to recover the molten slag 11 and the molten metal 12 separately.

(2) Having within the molten slag/metal pool a device for monitoring the amount of molten slag and metal stored therein:

For ensuring a high furnace operation stability it is very important to take care not to allow too much molten slag and metal to stay within the furnace. This is because if molten slag and metal stay too much within the furnace, with consequent increase of pressure loss in the furnace, there occurs hanging or channeling, which can lead to the occurrence of a furnace trouble. In general, however, components and properties of wastes are not uniform and vary greatly, so it is impossible to check how much molten slag and metal are stored within the furnace.

As means for detecting the amount of molten slag and metal, a molten slag/metal height monitoring device 20 may be provided in the molten slag/metal pool 19, whereby it becomes possible to monitor the position of molten slag and metal directly.

As the molten slag/metal height monitoring device 20 there may be used a known device such as a monitor using optical fiber or an ultrasonic level meter.

(3) Having equipment for blowing off a combustion sustaining gas and fuel for heat retention and/or heat-up into the molten slag/metal pool:

In the case where the volume of wastes to be treated is relatively small, molten slag is easy to be cooled and solidified, so for a stable discharge of molten slag and metal it is preferable and effective to monitor the temperature of the molten slag/metal pool 19 and cause both fuel 23 and combustion sustaining gas 22 to burn with use of a burner 21 as necessary, thereby permitting the supply of heat. For the maintenance of the burner 21 it is preferable that the burner be cooled with cooling water 24.

(4) Constructing the furnace wall 5 (a metal structure which forms the furnace wall, also called shell in the case of a ferrous material) with a refractory and having means for cooling the back of the refractory:

For suppressing the erosion and wear of the lining refractory 4 it is effective to provide a cooling device 25 outside the furnace, i.e., at the back of the furnace wall 5. As the cooling device there may be used, for example, a stave type, jacket type, or shower type cooling device.

(5) At least one of the furnace center lance and upper and and lower tuyeres is made of copper and has a water-cooling structure and an intra-furnace peep window is formed in each lower tuyere:

The furnace center lance 6-3, upper tuyeres 6-2 and lower tuyeres 6-1 are all exposed to a very severe atmosphere of a high temperature and so are apt to undergo wear and melt-off. For ensuring a sound state over a long period and for enhancing the cooling capacity it is effective to let each tuyere have a water-cooling structure, pass cooling water 26 and form each tuyere using copper which is superior in thermal conductivity.

The lower tuyeres 6-1 have function to burn carbon contained in the waste residue which has been heated to a high temperature in the fire spot and permit ash and metals contained in the residue to burn at that temperature. In many cases, however, components and properties of wastes are heterogeneous and carbon may not be contained in the residue. If the carbon-free period is long, the combustion sustaining gas 7-1 blown off into the furnace from the lower tuyeres 6-1 merely functions as cooling gas, so that the temperature drops and there may occur a trouble such that ignition fails to take place due to a low temperature even if carbon in the thermal decomposition residue falls to the position in front of the lower tuyeres 6-1. For quickly checking whether ignition took place or not and for taking an appropriate measure quickly it is preferable that a peep window be formed in each lower tuyere 6-1.

(6) A lower end of each bottom-stage lower tuyere is positioned lower than an intermediate height position between an upper end position of the molten slag/metal outlet and a lower end position of the wastes inlet:

The reason why the lower end of each bottom-stage lower tuyere is located at a position shorter than a half distance from the lower side between the upper end position of the molten slag/metal outlet and the lower end position of the wastes inlet is that if this condition is not followed, then when a fire spot of a high temperature is formed centrally on the upper end surface of the introduced wastes using the furnace center lance 6-3 and a concentrative melting region is formed by a combination of the lower tuyeres 6-1 projecting into the furnace, it is difficult to form a stable melting region particularly at the lower portion. Unless a concentrative melting region is formed, a stream of molten slag and metal is not formed, so that stable flowing of molten slag and metal to the wastes out let 9 is impeded and the furnace operation becomes unstable.

The following description is provided about preferred modes of the gasification and melting method for wastes.

(7) Using oxygen 85% or more in purity as a combustion sustaining gas:

The combustion sustaining gas used most commonly is air, but up to 79% of air is made up of inert components, and from the standpoint of making produced gas high in calorie and decreasing the amount of gas produced which is advantageous to the reduction in size of the furnace body and post-treatment equipment for gas, the use of a combustion sustaining gas having a high oxygen concentration is suitable.

From the standpoint of operation it is essential that the temperature at the fire spot level at which the combustion sustaining gas 7 from the furnace center lance 6-3 and the lower tuyeres 6-1 strikes against the wastes be held at 2000° C. or higher. For realizing this temperature it is necessary to use a combustion sustaining gas having an oxygen concentration of 50% or more according to a theoretical flame temperature calculation. From the standpoint of effective utilization of an energy gas, a gas calorie needs at least 1200 kcal/Nm$^3$. For preventing the dilution of gas it is preferable that the combustion sustaining gas be oxygen having a purity of 85% or more.

(8) Controlling the ratio of the diameter, df, of a fire spot formed by the furnace center lance to the inside diameter, D, of the furnace to a value of df/D≦0.6 by moving the furnace center lance vertically:

As noted above, by concentrating the melting region centrally to form a stream of molten slag and metal, the furnace operation becomes stable. As a result of having studied an appropriate degree of concentration on the basis of the dischargeability of molten slag and metal from the molten slag/metal outlet it was found desirable that the ratio of the diameter, df, of the fire spot formed by the furnace center lance 6-3 to the furnace inside diameter, D, be in the range of df/D≦0.6.

(9) An average gas flowing velocity in the portion higher than the wastes inlet within the furnace is 1.0 m/s or lower:

A too high gas flowing velocity in the furnace is not desirable because a large amount of dust that is carried on the flow to the exterior of the furnace is discharged from the gas outlet 10. We have checked a relation between an average gas flowing velocity and the concentration of dust contained in exhaust gas.

Figure 5:
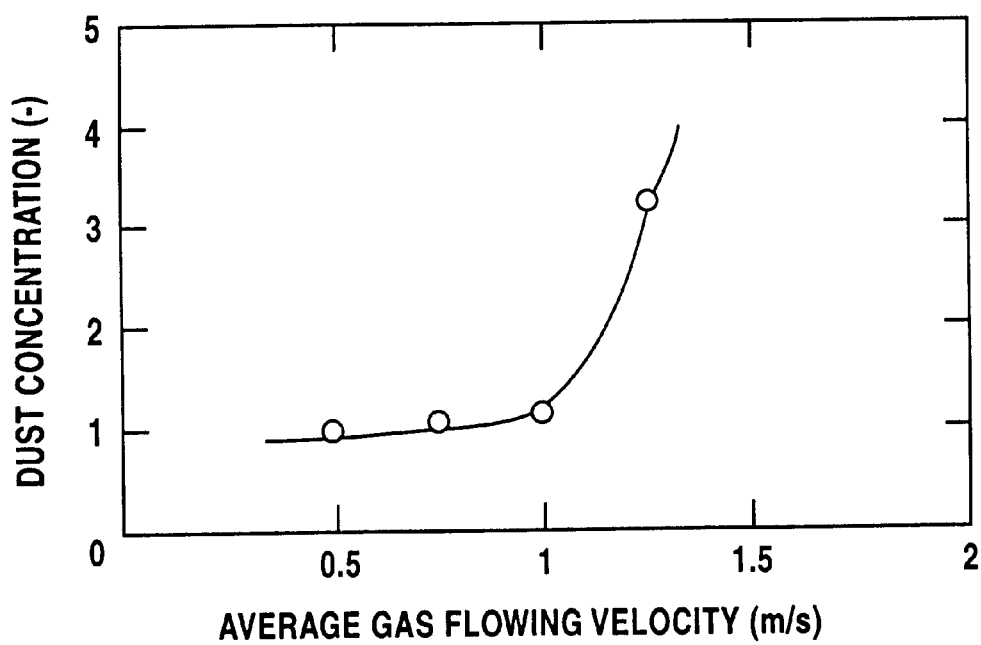
FIG. 5 is a graph showing a relation between an average gas flowing velocity within the furnace and a dust concentration in discharged gas.

FIG. 5 shows a relation between an average flowing velocity of produced gas and the concentration of dust contained in discharged gas.

In the same figure, the exhaust gas dust concentration plotted along the axis of ordinate represents an index assuming that the dust concentration at an average flowing velocity of produced gas of 0.5 m/s is 1.

As shown in the same figure, when the average gas flowing velocity exceeds 1.0 m/s, the dust concentration in discharged gas increases suddenly. From this fact it turned out desirable that the average gas flowing velocity be not higher than 1.0 m/s.

(10) The basicity ($CaO/SiO_2$ mass ratio) in the resulting molten slag is in the range of 0.6 to 1.2:

The basicity ($CaO/SiO_2$ mass ratio) is a factor which greatly dominates the fluidity of slag, and if this fluidity is deteriorated, there arises a fear that the molten slag/metal dischargeability may be deteriorated and hence the condition of furnace operation may become unstable. From the standpoint of fluidity it is necessary that the basicity in question be 0.6 or more. If it exceeds 1.2, CaO liberated after solidifying of slag reacts with water into $Ca(OH)_2$, so that the slag becomes easier to disintegrate, thus giving rise to a problem in point of re-utilization as a base course material. For this reason we have defined that the upper limit should be 1.2. Even if another utilization method not requiring a high strength is thought out, disintegration of the slag may cause melting-out of heavy metals, which is not desirable.

(11) The basicity ($CaO/SiO_2$ mass ratio) in the resulting molten slag is adjusted to a value in the range of 0.6 to 1.2 by introducing a sub feedstock containing CaO and/or a sub feedstock containing $SiO_2$:

For adjusting the basicity ($CaO/SiO_2$ mass ratio) it is effective to introduce into the furnace a sub feedstock containing CaO, e.g., limestone, or a sub feedstock containing $SiO_2$, e.g., silica sand.

From the standpoint of making the furnace operation stable and highly efficient, diminishing dust and dioxins and effective utilization of energy gas it is desirable to use the following equipment (12) to (22) and the following methods (23) to (28).

(12) As equipment installed in front of the wastes inlet there are used at least one of drying equipment for drying wastes, equipment for removing metals and/or glasses from wastes, and compacting equipment for compacting wastes:

By using wastes drying equipment in front of the wastes inlet the evaporation of moisture within the furnace becomes minimum and it becomes possible to diminish the variation in the amount and calorie of produced gas when wastes are introduced into the furnace, with the result that the furnace operation becomes stable.

By using equipment for removing metals from wastes the mixing of metals into slag becomes minimum, thus permitting the formation of high-quality slag. Besides, since metals can be recovered in an unmelted state, it becomes possible to carry out an energy-saving operation.

By using equipment for removing glasses from wastes it is possible to diminish energy necessary for slagging within the furnace, thus permitting an energy-saving operation.

By using equipment for compacting wastes it is possible to suppress a change in shape (especially an increase of surface area) of wastes after introduced into the furnace, whereby it becomes possible to keep the reaction in the furnace constant and hence possible to diminish a variation in the amount and calorie of produced gas.

(13) Equipment for removing metals and/or glasses from wastes and equipment for compacting wastes are installed in this order in front of the wastes inlet:

By so installing the equipment it is possible to diminish wear of a casing portion of the compacting equipment.

(14) Equipment for drying wastes (51), equipment for removing metals and/or glasses from wastes (52), and equipment for compacting wastes (53) are installed in this order in front of the wastes inlet:

By removing metals and glasses from wastes after drying, combustible matters which had been adhered to metals and glasses before drying becomes easier to separate, so that the percent mixing of foreign matters in wastes is reduced and it is possible to diminish wear of the casing portion of the compacting equipment as noted above.

(15) Using equipment for cooling discharged gas as equipment installed behind the gas outlet in the gasification and melting furnace:

Since produced gas having a temperature of 1000° C. to 1400° C. is discharged from the gas outlet, it is necessary to provide cooling equipment.

As the method for cooling it is desirable to adopt a water spray cooling method. The reason is that the water spray cooling method gives a high cooling speed and that therefore the temperature controllability against a variation in the amount of gas produced (=cooling load variation) is superior. Besides, the water spray cooling method is effective also against dioxin.

(16) Using a dust remover for separating dust from the discharged gas as equipment installed behind the gas cooling equipment:

With the dust remover so installed, not only unburnt dust but also dust derived from gas can be removed by the dust remover after conversion into solid on cooling. Installing the dust remover behind the gas cooling equipment is effective particularly in the separation of dioxin and low-boiling heavy metal dust.

(17) The dust remover is a bag filter:

The reason why a bag filter is adopted for the removal of dust is because the dust removing efficiency for fine particles is high and particularly the dioxin removing efficiency is high.

(18) A bypass pipe connecting between a gas outlet of the gas cooling equipment and a gas outlet of the dust remover is provided:

In the case of adopting a bag filter as the dust remover, if gas which contains much moisture flowing out from the previous gas cooling equipment passes through the bag filter, there occurs moisture condensation on both filter cloth and casing, with consequent clogging of filter cloth and corrosion of the casing, which may lead to shortening of the equipment life. Further, an abnormal degree of increase in pressure loss of the filter cloth may result in the operation being no longer continued.

In view of this point, until the temperature is raised to 100° C. or higher by an independent heater in the dust remover, the gas from the gas cooling equipment is passed through a connection pipe which bypasses the dust remover and is thereby flowed to the equipment which follows, whereby it is possible to suppress the occurrence of the above inconvenience.

(19) At least one of desulfurization equipment (56), denitrification equipment (57), and energy recovering equipment (58) is installed behind the dust remover:

Main harmful components contained in gas are HCl, SOx, $H_2S$, and NOx, of which HCl and SOx are almost removed by the dust remover, but $H_2S$ and NOx are not removed. In view of this point, by installing equipment for desulfurization and denitrification behind the dust remover, 90% or more of $H_2S$ and NOx is removed and the gas leaving both equipment becomes a clean gas when it is viewed from the environmental standpoint. Also in point of recovery of energy to be utilized as fuel in a boiler or the like, the gas finds various uses and can be utilized effectively.

(20) The gas outlet of the gasification and melting furnace and at least one of gas cooling equipment (54), dust remover (55), desulfurization equipment (56), denitrification equipment (57), and energy recovery equipment (58) are connected together through a connecting pipe having an expansion.

At the time of start and stop of plant operation there occurs a temperature variation in each equipment and a temperature gradient is developed from equipment located in an upper process toward equipment located in a lower process, so that the connecting pipe laid between adjacent equipment undergoes an expanding and contracting action. By providing an expansion in the connecting pipe it becomes possible to absorb expansion and contraction of the pipe, prevent the occurrence of stress on each equipment and hence protect the equipment.

In the event of emergency stop of the plant, $N_2$ gas is usually blown off into the system to effect rapid cooling, so that the expansion or contraction stress becomes larger than that at the time of start and stop of plant operation. Also as a measure against this emergency stop of the plant it is desirable to connect equipment through a connecting pipe having an expansion.

(21) Dust remover is installed in two or more stages:

The dust collection efficiency can be increased by providing the dust remover in two or more stages.

(22) The dust remover has adjuvant blow-off equipment:

If the dust remover has equipment for blowing off an adjuvant such as slaked lime, the adjuvant adheres to the surface of filter cloth to form a coating layer of the adjuvant, whereby the reactivity with HCl and SOx is improved and the percent dust removal increases.

It also becomes possible to remove a gaseous portion of dioxin and the percent removal of dioxin becomes 90% or more.

Figure 6:
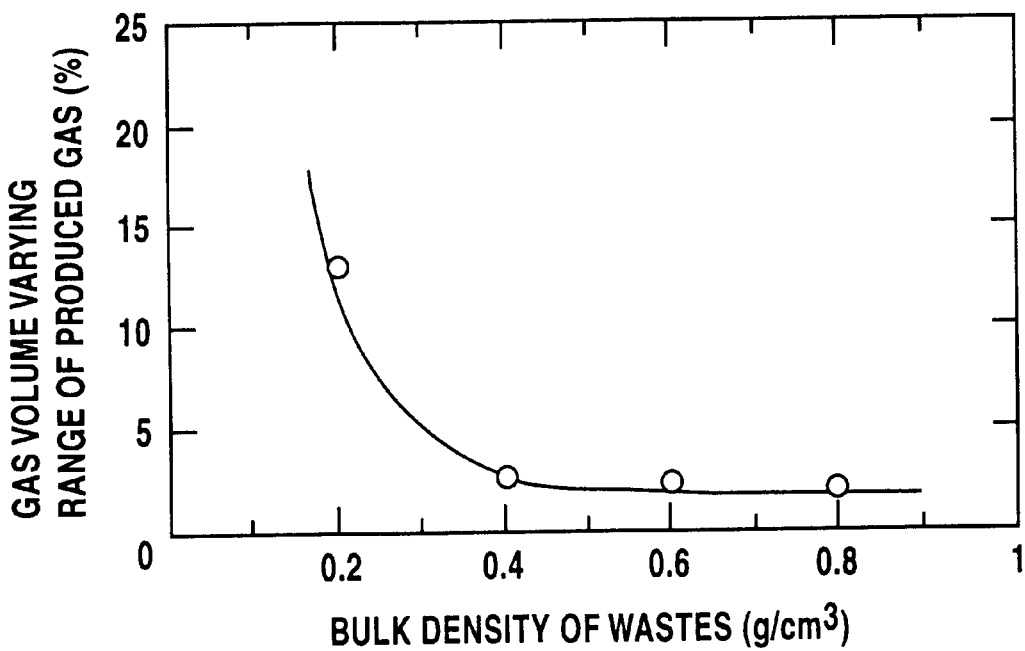
FIG. 6 is a graph showing a relation between the bulk density of wastes introduced into a furnace body and a gas volume varying range of produced gas.

(23) The bulk density of wastes introduced into the gasification and melting furnace is 0.3 $g/cm^3$ or more:

FIG. 6 is a graph showing a relation between the bulk density of wastes introduced into the furnace and a variation range in the amount of gas produced. The variation range in the amount of produced gas is not constant and exhibits intermittent peaks due to different timings and amounts of wastes introduced into the furnace and due to different wastes' compositions and therefore indicates the ratio (%) of a difference between peak quantity of produced gas and average quantity thereof to an average quantity of produced gas per unit time.

As shown in the same figure, if the bulk density of wastes is not lower than 0.3 $g/cm^3$, the variation range in the amount of produced gas is small and a stable operation is ensured.

Figure 7:
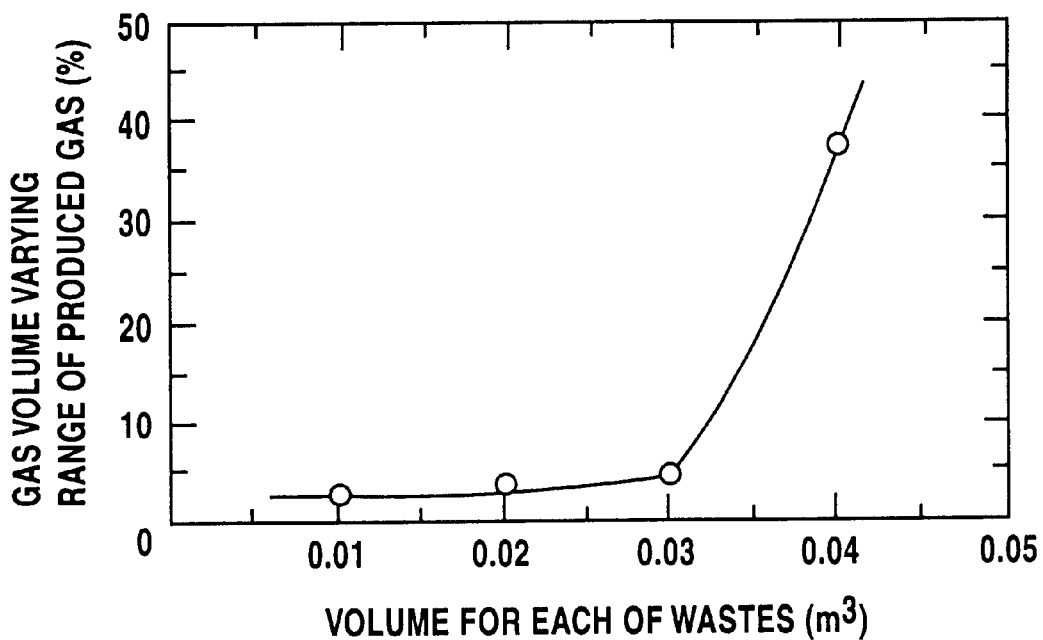
FIG. 7 is a graph showing a relation between the volume for each of the wastes introduced into the furnace body and a gas volume varying range of produced gas.

(24) The volume of each of wastes introduced into the gasification and melting furnace is 0.03 $m^3$ or less:

FIG. 7 is a graph showing a relation between the volume of each of wastes introduced into the furnace, i.e., feed unit volume, and a variation range in the amount of produced gas.

As shown in the same figure, if the volume of each waste is 0.03 $m^3$ or less, the variation range in the amount of produced gas is small and a stable operation is ensured.

Figure 8:
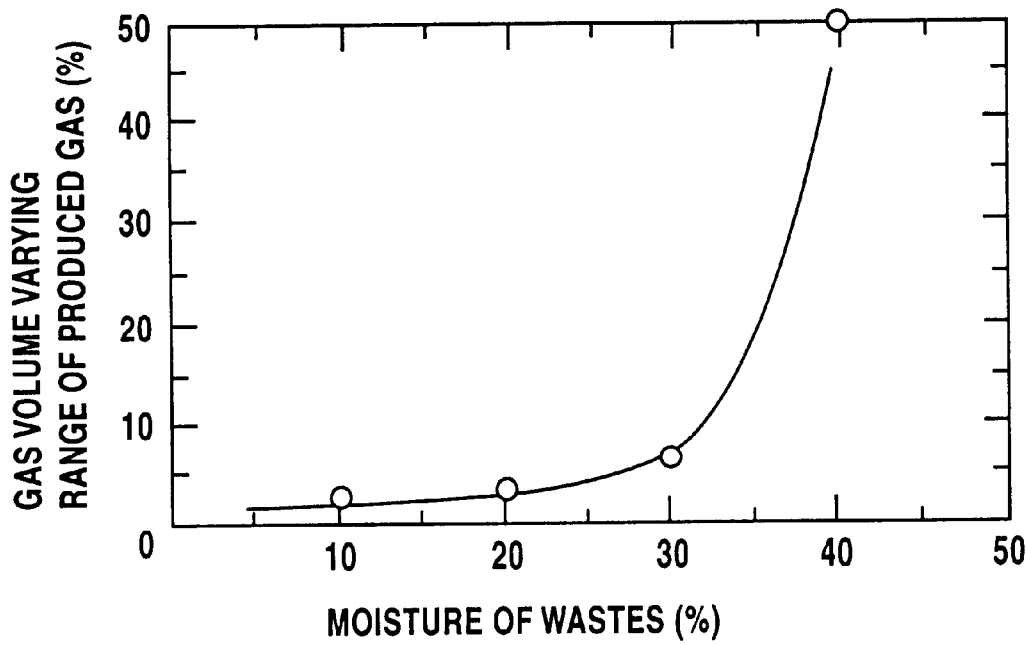
FIG. 8 is a graph showing a relation between the moisture contained in the wastes introduced into the furnace body and a gas volume varying range of produced gas.

(25) The moisture of wastes introduced into the gasification and melting furnace is 30% or less in terms of mass %:

FIG. 8 is a graph showing a relation between the moisture of wastes introduced into the furnace and a variation range in the amount of produced gas.

As shown in the same figure, if the moisture contained in wastes is 30% or less, the variation range in the amount of produced gas is small and it is possible to effect a stable operation.

Figure 9:
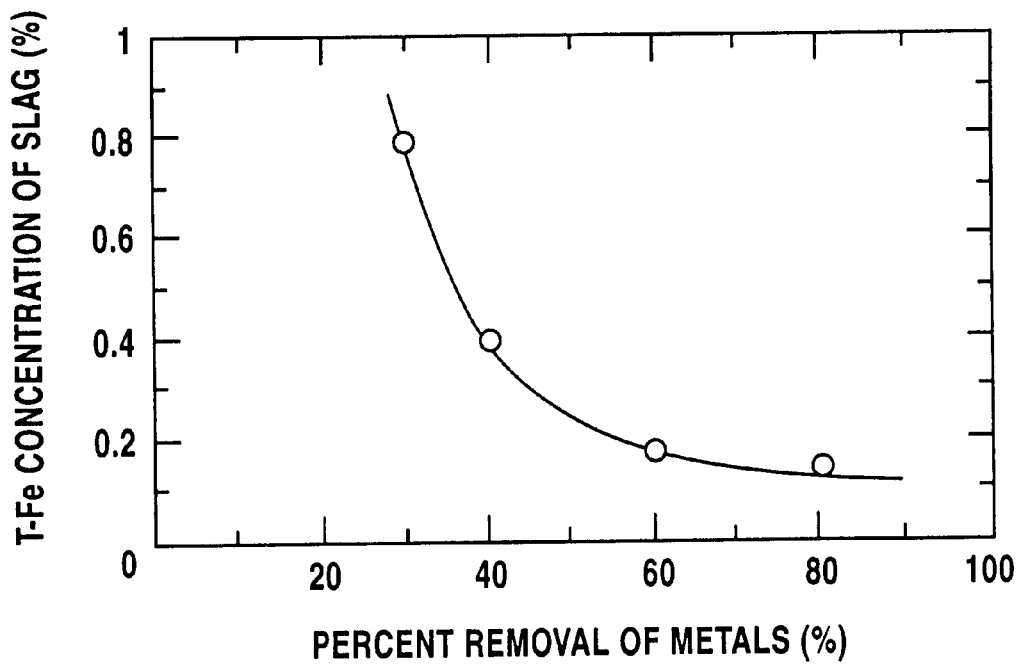
FIG. 9 is a graph showing a relation between a percent removal of metals from the wastes introduced into the furnace body and T—Fe concentration in slag.

(26) 50% or more, in terms of mass %, of each of metals and glasses contained in wastes introduced into the furnace is removed in advance:

FIG. 9 is a graph showing a relation between the percent removal of metals from the introduced wastes and T—Fe concentration in slag.

As shown in the same figure, if the percent removal of metals from the wastes is 50% or more, it becomes possible to adjust the T—Fe concentration in slag to 0.2% or less, thus affording slag of a high quality.

Figure 10:
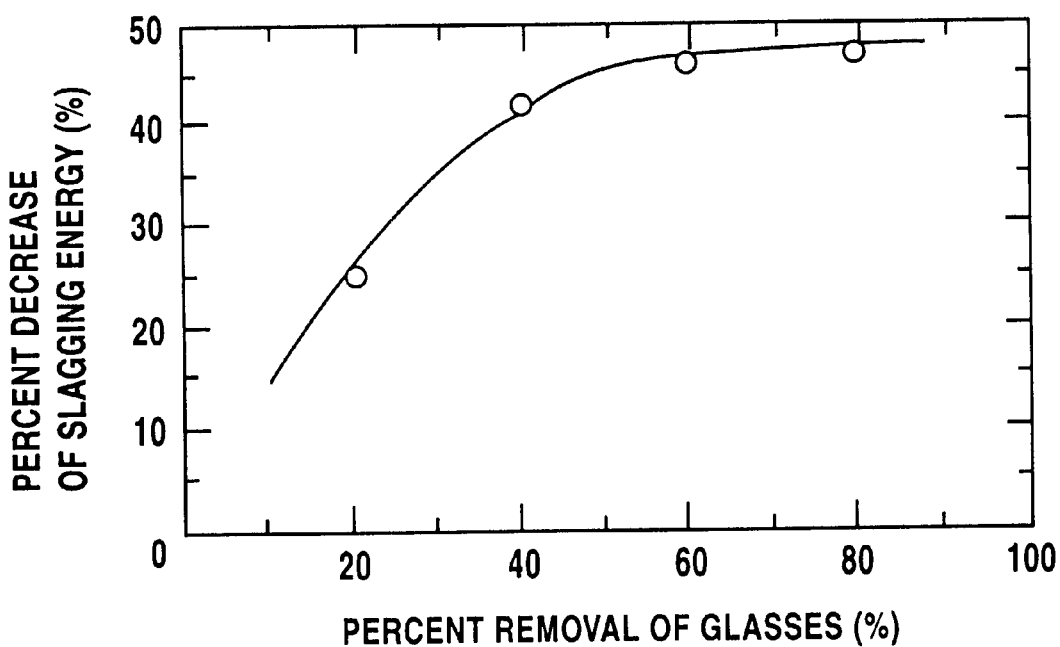
FIG. 10 is a graph showing a relation between a percent removal of glasses from the wastes introduced into the furnace body and a percent decrease of slagging energy.

FIG. 10 is a graph showing a relation between the percent removal of glasses from wastes introduced into the furnace and the percent drop of slagging energy. The slagging energy indicates an energy required for melt-slagging slag components contained in the introduced wastes and sub feedstock. The percent drop of slagging energy represents the ratio (%) of slagging energy with glasses removed from the wastes to slagging energy with glasses not removed.

As shown in the same figure, if the percent removal of glasses from wastes is 50% or more, it is possible to adjust the percent drop of slagging energy to 40% or more.

(27) Discharged gas cooling equipment is installed behind the gas outlet, an inlet temperature of the gas cooling equipment is in the range of between 1000° C. and 1400° C., and discharged gas is cooled to a temperature in the range of between 120° C. and 200° C. within 2 seconds in the gas cooling equipment:

By cooling gas of 1000° C. to 1400° C. as a gas cooling equipment inlet temperature to 2000° C. or lower within 2 seconds in the gas cooling equipment it is possible to prevent re-synthesis of dioxin. The reason for setting the lower limit at 120° C. is because it is intended to prevent corrosion of a duct, etc. due to moisture condensation in the equipment which follows the gas cooling equipment.

Figure 11:
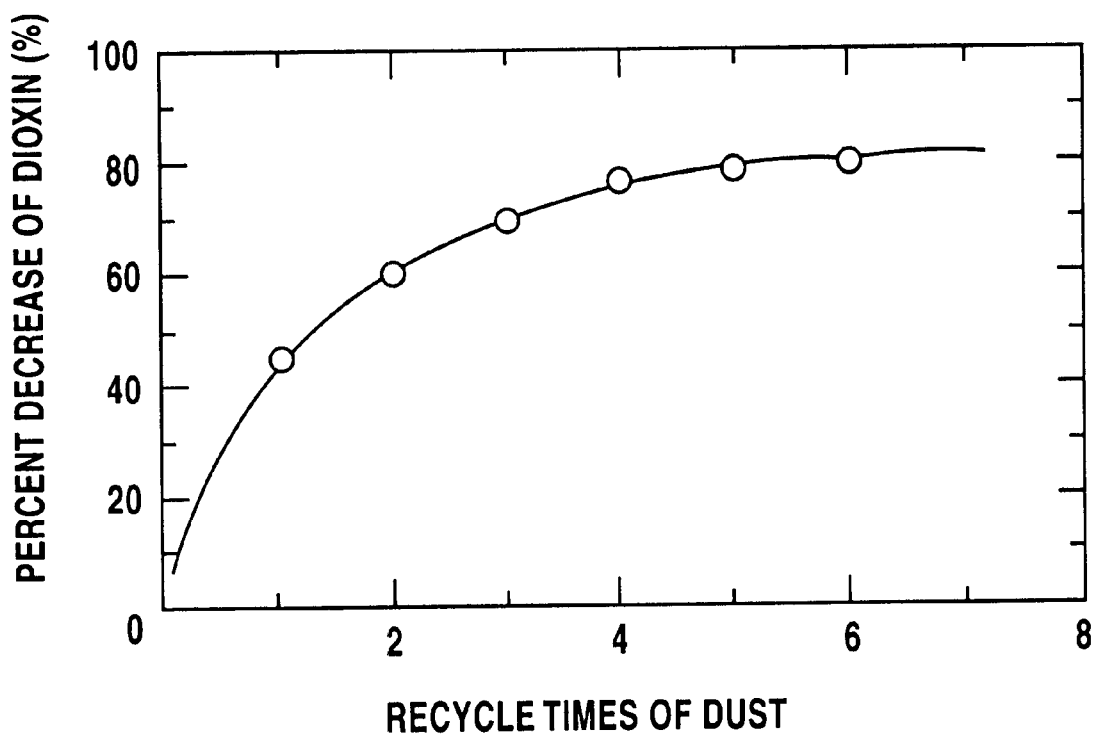
FIG. 11 is a graph showing a relation between how many times dust is recycled and a percent decrease of dioxin discharged.

(28) Recycling the dust recovered by the dust remover into the furnace body:

FIG. 11 is a graph showing a relation between how many times the dust recovered by the dust remover is recycled and the percent decrease of dioxin discharged to the exterior of the system.

As shown in the same figure, the larger the number of times the dust is recycled, the larger the percent decrease of dioxin becomes, but this effect reaches saturation at a recycle count of five. Thus, the recycle count of five is most effective.

The effect of recycling the dust resides in that heavy metals and unburnt carbon contained in the dust can also be re-fixed to slag and re-burnt. There also is attained an effect that the amount of dust produced can be decreased.

[Embodiments]

(Embodiment 1)

Tests shown in the following examples were conducted continuously for one month and the results obtained were evaluated.

Table 1 below shows the results of tests conducted in Example 1 and Comparative Examples 1 to 5.

Table 2 below shows the results of tests conducted in Examples 2 to 4 and Comparative Examples 6 and 7.

In the following tables, $Nm^3/h$ as a unit of gas feed quantity means $m^3$ (normal condition)/h, while t/d means mass ton/day.

TABLE 1

|  |  | Ex. 1 | Comp. Ex. 1 | Comp. Ex. 2 | Comp. Ex. 3 | Comp. Ex. 4 | Comp. Ex. 5 |
|---|---|---|---|---|---|---|---|
| Conditions |  |  |  |  |  |  |  |
| Total oxygen feed | $Nm^3/h$ | 205 | 205 | 205 | 205 | 205 | 205 |
| Furnace Center Lance |  |  |  |  |  |  |  |
| Feed quantity |  |  |  |  |  |  |  |
| $O_2$ | $Nm^3/h$ | 65 | 65 | 65 | 65 | 65 | 65 |
| $N_2$ | $Nm^3/h$ | (1)— | 10 | 0 | — | — | — |
| LPG | $Nm^3/h$ | — | 0 | 10 | — | — | — |
| Position |  | on furnace axis | on furnace axis | on furnace axis | on furnace axis | on furnace axis | off furnace axis |
| df/D |  | 0.6 | 0.6 | 0.6 | 0.6 | 0.6 | 0.6 |
| Upper tuyere |  |  |  |  |  |  |  |
| Feed quantity |  |  |  |  |  |  |  |
| $O_2$ | $Nm^3/h$ | 95 | 95 | 95 | 100 | 115 | 95 |
| $N_2$ | $Nm^3/h$ | — | — | — | 12 | 0 | — |
| LPG | $Nm^3/h$ | — | — | — | 0 | 12 | — |
| Angle (toward the furnace axis) | deg | 45 | 45 | 45 | 45 | 45 | 45 |
| Lower tuyere |  |  |  |  |  |  |  |
| Feed quantity |  |  |  |  |  |  |  |
| $O_2$ | $Nm^3/h$ | 45 | 45 | 45 | 40 | 25 | 45 |
| $N_2$ | $Nm^3/h$ | 0 | 0 | 0 | 0 | 0 | 0 |
| LPG | $Nm^3/h$ | 3 | 3 | 3 | 3 | 3 | 3 |
| Projection length | mm | 100 | 100 | 100 | 100 | 100 | 100 |
| Lowest-stage position(2) |  | 0.3 | 0.3 | 0.3 | 0.3 | 0.3 | 0.3 |
| Results |  |  |  |  |  |  |  |
| Operation |  |  |  |  |  |  |  |
| Treatment quantity | t/d | 12.0 | 11.0 | 10.0 | 10.0 | 9.0 | 10.0 |
| Stability (stop by trouble: day/year) |  | Stable (0 day) | Unstable (12 days) | Unstable (24 days) | Unstable (8 days) | Unstable (16 days) | Unstable (wear deviation 15–20 mm in one month) |
| Others |  |  |  |  |  |  |  |
| Furnace center lance metal |  | Sound (4) | Sound | Sound | Sound | Sound | Wear |

TABLE 1-continued

|  | Ex. 1 | Comp. Ex. 1 | Comp. Ex. 2 | Comp. Ex. 3 | Comp. Ex. 4 | Comp. Ex. 5 |
| --- | --- | --- | --- | --- | --- | --- |
| Refractory near upper tuyeres(3) | Uniform | Uniform | Uniform | Uniform | Uniform | Not uniform |
| Refractory near lower tuyeres(3) | Sound (4) | Sound | Sound | Sound | Sound | Sound |

(Note)
(1) "—" represents that there is no blow-off equipment, distinguishing from zero feed quantity.
(2) Represented in terms of " (distance from the lower end of the lowest-stage lower tuyere to the upper end of the molten slag/metal outlet)/(distance from the wastes inlet lower end to the molten slag/metal outlet upper end)
(3) Coatings formed by dust or slag mixtures are also included.
(4) "Sound" indicates a state in which wear can be regarded as being almost nil.

TABLE 2

|  |  | Comp. Ex. 6 | Comp. Ex. 7 | Ex. 2 | Ex. 3 | Ex. 4 |
| --- | --- | --- | --- | --- | --- | --- |
| Conditions |  |  |  |  |  |  |
| Total oxygen feed | $Nm^3/h$ | 205 | 205 | 205 | 205 | 205 |
| Furnace Center Lance |  |  |  |  |  |  |
| Feed quantity |  |  |  |  |  |  |
| $O_2$ | $Nm^3/h$ | 65 | 65 | 65 | 65 | 65 |
| $N_2$ | $Nm^3/h$ | (1)— | — | — | — | — |
| LPG | $Nm^3/h$ | — | — | — | — | — |
| Position |  | on furnace axis | on furnace axis | on furnace axis | on furnace axis | on furnace axis |
| df/D |  | 0.6 | 0.6 | 0.6 | 0.6 | 0.4 |
| Upper tuyere |  |  |  |  |  |  |
| Feed quantity |  |  |  |  |  |  |
| $O_2$ | $Nm^3/h$ | 95 | 95 | 95 | 95 | 95 |
| $N_2$ | $Nm^3/h$ | — | — | — | — | — |
| LPG | $Nm^3/h$ | — | — | — | — | — |
| Angle (toward the furnace axis) | deg | 0 | 45 | 45 | 45 | 45 |
| Lower tuyere |  |  |  |  |  |  |
| Feed quantity |  |  |  |  |  |  |
| $O_2$ | $Nm^3/h$ | 45 | 45 | 45 | 45 | 45 |
| $N_2$ | $Nm^3/h$ | 0 | 0 | 0 | 0 | 0 |
| LPG | $Nm^3/h$ | 3 | 3 | 3 | 3 | 3 |
| Projection length | mm | 100 | 0 | 200 | 100 | 100 |
| Lowest-stage position(2) |  | 0.3 | 0.3 | 0.3 | 0.3 | 0.3 |
| Results |  |  |  |  |  |  |
| Operation |  |  |  |  |  |  |
| Treatment quantity | t/d | 12.0 | 11.0 | 12.0 | 12.0 | 12.0 |
| Stability (stop by trouble: day/year) |  | Stable (but following wear deviation repair is needed in one month) | Unstable (following wear deviation repair is needed in one month) | Stable (0 day) | Stable (0 day) | Stable (0 day) |
| Others |  |  |  |  |  |  |
| Furnace center lance metal |  | Residual thickness 1 mm/ Original thickness 6 mm | Sound(4) | Sound | Sound | Sound |
| Refractory near upper tuyeres(3) |  | Not uniform | Uniform | Uniform | Uniform | Uniform |

TABLE 2-continued

|  | Comp. Ex. 6 | Comp. Ex. 7 | Ex. 2 | Ex. 3 | Ex. 4 |
|---|---|---|---|---|---|
| Refractory near lower tuyeres(3) | Sound(4) | 20–30 mm wear | Sound | Sound | Sound |

(Note)
(1)"—" represents that there is no blow-off equipment, distinguishing from zero feed quantity.
(2)Represented in terms of " (distance from the lower end of the lowest-stage lower tuyere to the upper end of the molten slag/metal outlet)/(distance from the wastes inlet lower end to the molten slag/metal outlet upper end)
(3)Coatings formed by dust or slag mixtures are also included.
(4)"Sound" indicates a state in which wear can be regarded as being almost nil.

EXAMPLE 1

Using a vertical furnace shown in FIG. 1, a gasification and melting test for wastes was conducted. Sizes of various portions of the vertical furnace, as well as quantities and arrangement of tuyeres and attachments were as follows:

Size
 Furnace dia.: 2.0 m (furnace inside diameter after refractory lining)
 Furnace height: 6.0 m (height from the furnace bottom to the furnace top after refractory lining)

| Height from the molten slag/metal outlet upper end to the wastes inlet lower end: | 2.8 m |
|---|---|
| Height from the molten slag/metal outlet upper end to the lower tuyere lower end: | 0.8 m (lower stage) 1.6 m (upper stage) |
| Height from the molten slag/metal outlet upper end to the upper tuyeres: | 3.9 m (lower stage) 4.7 m (upper stage) |
| Height from the furnace bottom to the tip of the furnace center lance: | standard 5.0 m (changeable vertically) |

Quantity
 Lower tuyeres: 3 (circumferential) ×2 stages (vertical)
 Upper tuyeres: 3 (circumferential) ×2 stages (vertical)
 Furnace center lance: 1
 Molten slag/metal outlet: 1
 Position measuring device for measuring the position of an upper end surface of introduced wastes: 1

Arrangement

| Lower tuyeres: | Equal intervals at 120° circumferentially The tip of each tuyere is projected 100 mm into the furnace from the lining refractory surface. |
|---|---|
| Upper tuyeres: | Equal intervals at 120° circumferentially Displaced 45° from the furnace axis direction |
| Furnace center lance: | Installed along the furnace center (on the furnace axis) |
| Molten slag/metal outlet: | Formed at an end of the furnace bottom |
| Position measuring device: | Disposed between the furnace center lance and the furnace side wall |

The wastes used in the above test were dried municipal wastes. The composition of the dried wastes and that of limestone as a sub feedstock are as set out in Tables 3 and 4.

In Table 3 are shown combustible components' compositions (mass %) of the dried wastes and the sub feedstock, while in Table 4 are shown incombustible components' compositions (mass %), exclusive of metals, contained in the dried wastes and the sub feedstock. Further, the compositions (volume of fuels (LPG) used are shown in Table 5. Pure oxygen was used as a combustion sustaining gas blown off into the furnace from the furnace center lance, the upper tuyeres and the lower tuyeres.

TABLE 3

|  | C | H | O | N | S | T.Cl | Moisture |
|---|---|---|---|---|---|---|---|
| Dried wastes | 40.0 | 6.3 | 33.2 | 0.9 | 0.12 | 0.7 | 9.0 |
| Limestone | 0.0 | 0.0 | 0.0 | 0.0 | 0.0 | — | 0.0 |

TABLE 4

|  | $SiO_2$ | CaO | $Al_2O_3$ | $Fe_2O_3$ | $Na_2O$ | $K_2O$ | $CaCO_3$ |
|---|---|---|---|---|---|---|---|
| Dried wastes | 2.7 | 1.8 | 1.2 | 0.25 | 0.46 | 0.31 | 0.0 |
| Limestone | 0.5 | 0.0 | 0.0 | 0.5 | 0.0 | 0.0 | 97.3 |

TABLE 5

| Propane $C_3H_8$ | 20 |
|---|---|
| Butane $C_4H_{10}$ | 80 |

(Procedure for Setting Treatment Conditions)
(1) The composition of wastes introduced into the furnace was analyzed, then an approximate value of an oxygen feed quantity was determined from the amount of carbon, and the quantity of limestone to be fed as a slag forming material was determined from the quantity of slag component. The quantity of limestone to be fed was adjusted so as to give a slag basicity ($CaO/SiO_2$ mass ratio) of 1.0 at which value the fluidity of molten slag is considered to be relatively high.
(2) The gasification and melting furnace was heated beforehand with a burner to create a state in which the introduced wastes ignited even with a combustion sustaining gas not heated but held at room temperature.
(3) Wastes were introduced into the furnace and stacked to a height of 2.0 m.
(4) Oxygen was flowed little by little from the lower tuyeres.
(5) The molten slag/metal outlet was opened.
(6) Since the upper end surface position of the introduced wastes becomes lower with combustion of the wastes, the wastes and limestone were replenished so as to keep the said position in the range of 1.9 m to 2.1 m.
(7) The quantity of oxygen fed from the furnace center lance and upper and lower tuyeres was adjusted so that the temperature measured by the thermocouple disposed near the upper end surface of the introduced wastes was held at 600° C. or higher and the temperature measured by the thermocouple disposed in the free board space was held in the range of 1000° C. to 1400° C.

More particularly, when the wastes lowering speed was high and it was impossible, at a predetermined quantity of wastes treated, to maintain the upper end surface position of the introduced wastes, the quantity of oxygen fed from the lower tuyeres, or from the furnace center lance as the case may be, was decreased. When the temperature near the upper end surface of the introduced wastes was lower than 600° C., the quantity of oxygen blown off into the furnace from the furnace center lance was increased. Likewise, when the temperature of the free board space was lower than 1000° C., the quantity of oxygen blown off from the upper tuyeres was increased. Conversely, when the temperature of the free board space exceeded 1400° C., the quantity of oxygen fed from the upper tuyeres, or from the furnace center lance as the case may be, was decreased.

(8) When a measured temperature of molten slag and metal discharged from the molten metal/slag outlet was lower than a predetermined temperature (a temperature at which at least molten slag and metal do not solidify, but here it was set at a temperature in the range of 1400° C. to 1600° C.), LPG was blown off into the furnace from the lower tuyeres. Further, the components of molten slag and metal were analyzed and the quantity of limestone to be fed was adjusted so as to give a predetermined slag basicity.

(9) The above (6) to (8) were repeated.

As is seen from Example 1 in Table 1, the number of furnace-stop day caused by some trouble was zero and a stable operation was performed.

Comparative Example 1

The same furnace as that used in Example 1 was used with the exception that the furnace center lance was replaced by equipment capable of blowing off fuel in addition to the combustion sustaining gas, and a test was conducted under the feed of purging $N_2$ for the prevention of clogging.

The compositions of wastes, sub feedstock, LPG and combustion sustaining gas used were the same as those used in Example 1, and the test followed the same procedure for setting treatment conditions as in Example 1. Also as to the total oxygen feed quantity, there was made adjustment so as to give the same quantity as in Example 1.

As is seen from Comparative Example 1 in Table 1, since the test was conducted under the feed of purging $N_2$ for the prevention of clogging, there was formed a low temperature region and melting was unstable, resulting in that the furnace operation was unstable.

Comparative Example 2

The same furnace as that used in Example 1 was used with the exception that the furnace center lance was replaced by equipment capable of blowing off fuel in addition to the combustion sustaining gas, and a test was conducted under the feed of LPG.

The compositions of wastes, sub feedstock, LPG and combustion sustaining gas used were the same as those used in Example 1, and the test followed the same procedure for setting treatment conditions as in Example 1. For facilitating the comparison of operation results there was made adjustment so that the total oxygen feed quantity was equal to that in Example 1.

As is seen from Comparative Example 2 in Table 1, oxygen was consumed in the combustion of LPG and there occurred inconveniences such as deterioration of the wastes treating capacity.

Comparative Example 3

The same furnace as that used in Example 1 was used with the exception that the upper tuyeres were replaced by equipment capable of blowing off fuel in addition to the combustion sustaining gas, and a test was conducted under the feed of purging $N_2$ for the prevention of clogging.

The compositions of wastes, sub feedstock, LPG and combustion sustaining gas were the same as those used in Example 1, and the test followed the same procedure for setting treatment conditions as in Example 1. For facilitating the comparison of operation results there was made adjustment so that the total oxygen feed quantity was equal to that in Example 1.

As is seen from Comparative Example 3 in Table 1, since the test was conducted under the feed of purging $N_2$ for the prevention of clogging, it is necessary, for compensating for the resulting temperature drop in the furnace upper portion, to increase the proportion of oxygen supplied to the upper tuyeres though the total oxygen feed quantity is constant, that is, decrease the proportion of oxygen supplied to the lower tuyeres, thus giving rise to inconveniences. For example, for continuing the operation stably it was required to decrease the quantity of wastes treated.

Comparative Example 4

The same furnace as that used in Example 1 was used with the exception that the upper tuyeres were replaced by equipment capable of blowing off fuel in addition to the combustion sustaining gas, and a test was conducted under the feed of LPG.

The compositions of wastes, sub feedstock, LPG and combustion sustaining gas used were the same as those used in Example 1, and the test followed the same procedure for setting treatment conditions as in Example 1. For facilitating the comparison of operation results there was made adjustment so that the total oxygen feed quantity was equal to that in Example 1.

As is seen from Comparative Example 4 in Table 1, due to an endothermic reaction induced by thermal decomposition of LPG, the temperature of the furnace upper portion dropped and the furnace operation became unstable.

Comparative Example 5

The arrangement of the furnace center lance used in Example 1 was changed in this comparative example.

Sizes of various portions of a vertical furnace, as well as quantities and arrangement of tuyeres and other attachments, used in this comparative example are as follows.

| Size: | same as in Example 1 |
|---|---|
| Quantity: | same as in Example 1 |
| Arrangement: | The furnace center lance was disposed at a position intermediate between the furnace axis and the furnace wall (on the side opposite to the position measuring device). Other points related to the arrangement were the same as in Example 1. |

The compositions of wastes, sub feedstock, LPG and combustion sustaining gas used were the same as in Example 1 and a test was conducted in accordance with the same procedure for setting treatment conditions as in Example 1. For facilitating the comparison of operation results there was made adjustment so that the total oxygen feed quantity was equal to that in Example 1.

As is seen from Comparative Example 5 in Table 1, the furnace operation became unstable because the position of a fire spot formed by the furnace center lance and that of a melting region formed by the lower tuyeres were different.

After the end of this test the furnace was cooled and the interior of the furnace was checked in a dismantled state to find that the lining refractory positioned closer to the furnace center lance was subjected to wear and that a wear deviation throughout the whole circumference was in the range of 15 to 20 mm after one-month furnace operation.

Also as to the furnace center lance itself, wear was observed to some extent.

Comparative Example 6

The installed direction of the upper tuyeres used in Example 1 was changed in this comparative example.

Sizes of various portions of a vertical furnace, as well as quantities and arrangement of tuyeres and other attachments, used in this comparative example are as follows.

| | |
|---|---|
| Size: | same as in Example 1 |
| Quantity: | same as in Example 1 |
| Arrangement: | The upper tuyeres were arranged toward the furnace axis. Other points related to the arrangement were the same as in Example 1. |

The compositions of wastes, sub feedstock, LPG and combustion sustaining gas used were the same as in Example 1, and a test was conducted in accordance with the same procedure for setting treatment conditions as in Example 1. For facilitating the comparison of operation results there was made adjustment so that the total oxygen feed quantity was equal to that in Example 1.

As is seen from Comparative Example 6 in Table 2, after the end of the test the furnace was cooled and the interior thereof was checked in a dismantled state to find that the surface of the furnace lining refractory was covered with a solid mixture of wastes and dust or of wasters and slag, but the thickness of the coating was not uniform in comparison with that in Example 1. As to the furnace center lance, its metal portion was worn out to a residual thickness of 1 mm from the original thickness of 6 mm. A further continuation of the operation would have caused a serious trouble.

Comparative Example 7

The arrangement of the lower tuyeres in Example 1 was changed in this comparative example.

Sizes of various portions of a vertical furnace, as well as quantities and arrangement of tuyeres and other attachments, used in this comparative example are as follows.

| | |
|---|---|
| Size: | same as in Example 1 |
| Quantity: | same as in Example 1 |
| Arrangement: | The lower tuyeres were installed so that their tips were flush with the surface of the lining refractory (projection length: 0 mm). Other points related to the arrangement were the same as in Example 1. |

The compositions of wastes, sub feedstock, LPG and combustion sustaining gas used were the same as in Example 1 and a test was conducted in accordance with the same procedure for setting treatment conditions as in Example 1. For facilitating the comparison of operation results there was made adjustment so that the total oxygen feed quantity was equal to that in Example 1.

As is seen from Comparative Example 7 in Table 2, the concentration of a melting region formed by the lower tuyeres was weakened, so that the molten slag/metal dischargeability was deteriorated and the furnace operation became unstable. After the end of the test, the furnace was cooled and the interior thereof was checked in a dismantled state; as a result, a marked wear (20 to 30 mm in one month) was found in the refractory near the lower tuyeres.

EXAMPLE 2

Also in this example, like the Comparative Example 7, the arrangement of the lower tuyeres in Example 1 was changed, provided in this example that the lower tuyeres were projected to a greater extent than in Example 1.

Sizes of various portions of a vertical furnace, as well as quantities and arrangement of tuyeres and other attachments, used in this example are as follows.

| | |
|---|---|
| Size: | same as in Example 1 |
| Quantity: | same as in Example 1 |
| Arrangement: | The lower tuyeres were installed so that their tips were projected 200 mm to the furnace interior from the surface of the lining refractory. Other points related to the arrangement were the same as in Example 1. |

The compositions of wastes, sub feedstock, LPG and combustion sustaining gas used were the same as in Example 1 and a test was conducted in accordance with the same procedure for setting treatment conditions as in Example 1. For facilitating the comparison of operation results there was made adjustment so that the total oxygen feed quantity was equal to that in Example 1.

As is seen from Example 2 in Table 2, the results of the test were almost the same as in Example 1 and it was possible to continue the operation stably.

EXAMPLE 3

In this example the quantity of the lower tuyeres in Example 1 was changed and there were used only one stage of lower tuyeres. Sizes of various portions of a vertical furnace, as well as quantities and arrangement of tuyeres and other attachments, used in this example are as follows.

| | |
|---|---|
| Size: | Height from the upper end of the molten slag/metal outlet to the lower end of lower tuyeres: 0.8 m Other points related to the size were the same as in Example 1. |
| Quantity: | Lower tuyeres . . . 3 (circumferential) × 1 stage (vertical) Other points related to quantity were the same as in Example 1. |
| Arrangement: | same as in Example 1 |

The compositions of wastes, sub feedstock, LPG and combustion sustaining gas used were the same as in Example 1 and a test was conducted in accordance with the same procedure for setting treatment conditions as in Example 1. For facilitating the comparison of operation results there was made adjustment so that the total oxygen feed quantity was equal to that in Example 1.

As is seen from Example 3 in Table 2, the results of the test were almost the same as in Example 1 and it was possible to continue the operation stably.

EXAMPLE 4

The tip position of the furnace center lance in Example 1 was adjusted to change the df/D ratio. Sizes of various portions of a vertical furnace, as well as quantities and arrangement of tuyeres and other attachments, used in this example are as follows.

| Size: | Height from the furnace bottom to the tip of the furnace center lance . . . 4.0 m Other points related to the size were the same as in Example 1. |
|---|---|
| Quantity: | same as in Example 1 |
| Arrangement: | same as in Example 1 |

From the height, h1 (m), up to the tip of the furnace center lance and the upper end surface position, SL (m), of a fire spot formed by the furnace center lance, the diameter, df (m), of a fire spot formed by the furnace center lance is determined in accordance with the following equation and the ratio thereof to the furnace inside diameter, D (m), can be determined in a simple manner:

$$df = 2 \times (h1 - SL) \times \tan(\alpha/2) \ (m)$$

It is generally known that the value of $\alpha$ is in the range of 20° to 22°. In the case of the furnace center lance used in this test, the value of $\alpha$ is 22° irrespective of the quantity of the combustion sustaining gas blown off into the furnace. In Examples 1 and 4, df/D≈0.6 and df/D≈0.4, respectively.

The compositions of wastes, sub feedstock, LPG and combustion sustaining gas used were the same as in Example 1 and a test was conducted in accordance with the same procedure for setting treatment conditions as in Example 1. Further, for facilitating the comparison of operation results there was made adjustment so that the total oxygen feed quantity was equal to that in Example 1.

As is seen from Comparative Example 4 in Table 2, the results of the test were almost the same as in Example 1 and it was possible to continue the operation stably.
(Embodiment 2)

Using various conventional position measuring devices and measuring devices according to the present invention for measuring the position of an upper end surface of introduced wastes and using, as test samples of introduced wastes, refuse-derived solid fuel (RDF), dried wastes resulting from crushing, sorting and drying of garbages, and bottom ash, measurement errors were detected and compared as test results.

Figure 12:
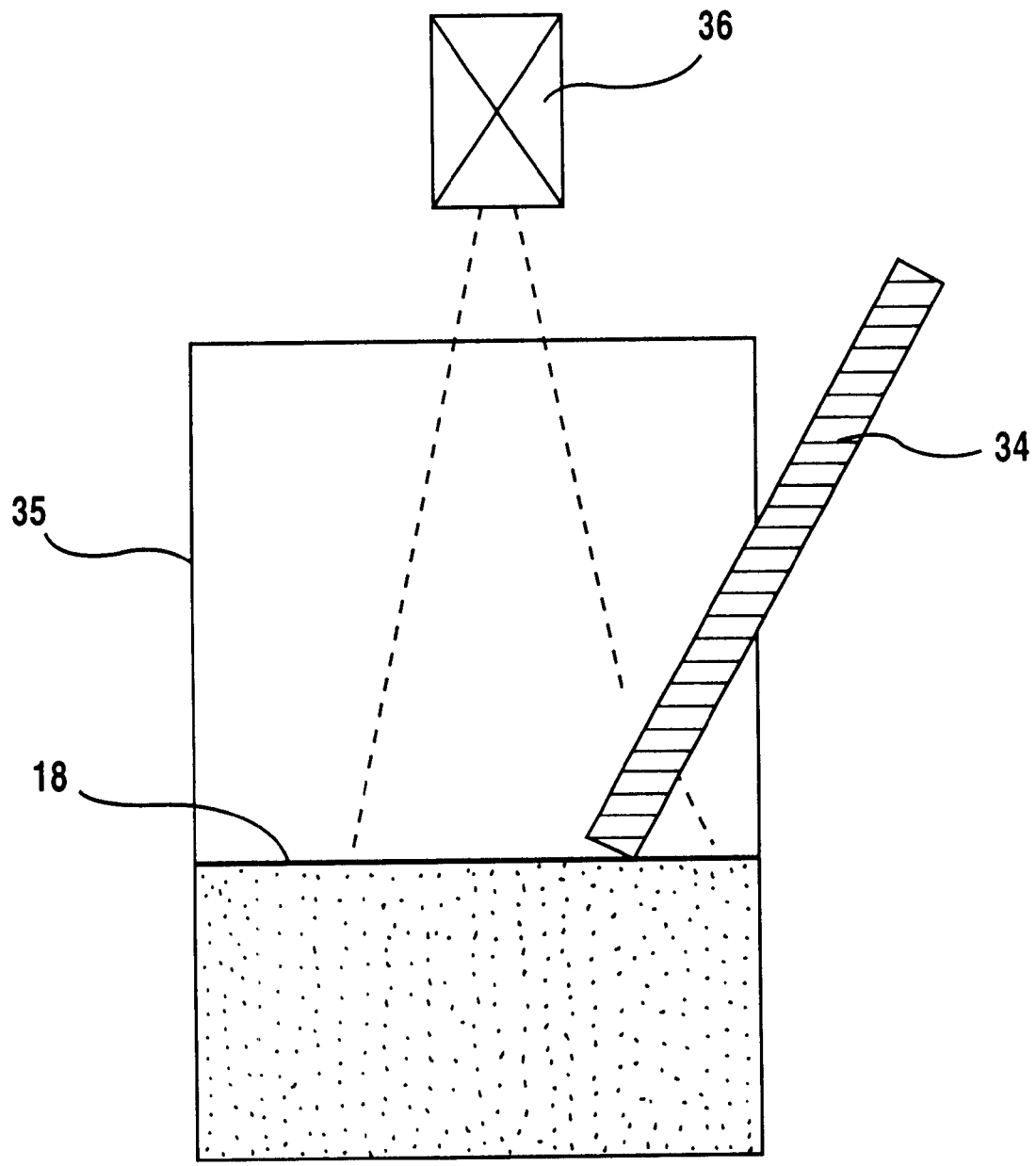
FIG. 12 is a conceptual diagram showing an example of a position measuring device for measuring the position of an upper end surface of introduced wastes according to Comparative Example 1.

FIG. 12 is a conceptual diagram showing an example of a position measuring device for measuring the position of an upper end surface of introduced wastes in Comparative Example 1.

In Comparative Example 1, as shown in the same figure, a measuring rod 34 positioned higher than an upper end surface 18 of introduced wastes was moved down while checking with a monitor camera 36, and the distance of movement of the measuring rod 34 was measured upon contact of the rod with the wastes upper end surface 18.

In Comparative Example 2, the monitor camera 36 was removed and a microwave level meter was mounted to the ceiling of the furnace to make measurement. In Comparative Example 3, an ultrasonic level meter was mounted to the furnace ceiling. In Comparative Example 4, a sounding device was mounted to the furnace ceiling to make measurement.

In Example 1, the measuring rod 34 shown in FIG. 12 was removed and the device for measuring the position of introduced wastes shown in FIGS. 2A and 2B was used in a position measuring test for the introduced wastes. It is possible to install the position measuring device to the furnace ceiling, but for the reason that other devices are mounted to the furnace ceiling, the position measuring device in Example 1 was installed to a side face of the furnace.

In Example 2, using the position measuring device for introduced wastes shown in FIGS. 3A and 3B, a position measuring test for the wastes was conducted in the same way as in Example 1.

Evaluation of the results obtained was performed by a method involving measuring the position of introduced wastes in a hot condition for each of test samples of wastes with use of each of the foregoing measuring devices, cooling the introduced wastes immediately thereafter and actually measuring the position of the wastes to determine a measurement error. Each test was repeated three times for making sure of reproducibility.

In the evaluation test, a target measurement error was set at 100 mm or less.

Table 6 shows measurement errors detected in the use of RDF as test samples of introduced wastes.

Table 7 shows measurement errors detected in the use of dried wastes as test samples of introduced wastes.

Table 8 shows measurement errors detected in the use of bottom ash as test samples of introduced wastes.

TABLE 6

| Measuring Method | Repetition of Tests | | | Classification |
|---|---|---|---|---|
| | 1st | 2nd | 3rd | |
| Measuring rod | unmeasurable | unmeasurable | unmeasureable | Comparative Example 1 |
| Microwave | 180 | 200 | 160 | Comparative Example 2 |
| Ultrasonic wave | unmeasurable | unmeasurable | unmeasurable | Comparative Example 3 |
| Sounding device | 70 | 200 | unmeasurable | Comparative Example 4 |
| Pipe | 70 | 50 | 80 | Example 1 |
| Large dia. pipe added | 3 | 4 | 8 | Example 2 |

(Note)
The numerals described in the table represent measurement errors (mm) in the use of RDF.

TABLE 7

| Measuring Method | Repetition of Tests | | | Classification |
|---|---|---|---|---|
| | 1st | 2nd | 3rd | |
| Measuring rod | unmeasurable | unmeasurable | unmeasurable | Comparative Example 1 |
| Microwave | 200 | 250 | 170 | Comparative Example 2 |

TABLE 7-continued

| Measuring Method | Repetition of Tests | | | Classification |
|---|---|---|---|---|
| | 1st | 2nd | 3rd | |
| Ultrasonic wave | unmeasurable | unmeasurable | unmeasurable | Comparative Example 3 |
| Sounding device | 70 | unmeasurable | unmeasurable | Comparative Example 4 |
| Pipe | 60 | 60 | 50 | Example 1 |
| Large dia. pipe added | 5 | 6 | 8 | Example 2 |

(Note)
The numerals described in the table represent measurement errors (mm) in the use of dried wastes.

TABLE 8

| Measuring Method | Repetition of Tests | | | Classification |
|---|---|---|---|---|
| | 1st | 2nd | 3rd | |
| Mesuring | unmeasurable | unmeasurable | unmeasurable | Comparative Example 1 |
| Microwave | 190 | 170 | 200 | Comparative Example 2 |
| Ultrasonic wave | unmeasurable | unmeasurable | unmeasurable | Comparative Example 3 |
| Sounding device | 60 | 150 | unmeasureable | Comparative Example 4 |
| Pipe | 50 | 50 | 55 | Example 1 |
| Large dia. pipe added | 4 | 6 | 5 | Example 2 |

(Note)
The numerals described in the table represent measurement errors (mm) in the use of bottom ash.

As shown in the above Tables 6 to 8, measurement errors detected in Example 1 are in the range of 50 to 80 mm, while in Example 2 there was obtained an accuracy of below 10 mm, independently of what type of wastes were introduced into the furnace.

As to the measurement accuracies obtained in Examples 1 and 2, the same results were obtained also by visual observation in a cold state.

As to the method adopted in Comparative Example 1 which involves moving down the measuring rod positioned higher than the upper end surface of introduced wastes while checking with a monitor camera and measuring the distance of movement of the measuring rod upon contact thereof with the wastes' upper end surface, the monitor camera could not detect an upper end surface of any of the wastes used during furnace operation, and thus it was impossible to effect measurement.

As to Comparative Example 4 using a sounding device, measurement could be done and accuracy was high in all of the first tests, but in the second or third tests there occurred wire breakage and measurement could not be performed stably because the device was used in a high-temperature environment of 1000° C. or higher.

In Comparative Example 2 using a microwave level meter, measurement errors exceeded 100 mm and thus this method was not practical.

As to the ultrasonic level meter used in Comparative Example 3, it was impossible to make measurement.

Industiral Applicability

By treating wastes with use of the gasification and melting furnace and method according to the present invention it is possible to stably produce slag, metals, and an energy gas which are high in added value.

What is claimed is:

1. A gasification and melting furnace for wastes comprising: a vertical furnace body and wherein wastes are burnt, organic matters contained in the wastes are gasified and recovered as an energy gas, and at the same time ash and metals contained in the wastes are recovered as melts, said furnace including a gas outlet, a molten slag/metal outlet, a wastes inlet, a furnace center lance, an upper tuyere, a lower tuyere, a position measuring device for measuring the position of an upper end surface of wastes introduced into the furnace, and an intra-furnace temperature measuring device, said gas outlet being formed in an upper portion of the furnace, said molten slag/metal outlet being formed in a lower portion of the furnace, said wastes inlet being formed in a position between said molten slag/metal outlet and said gas outlet, said furnace center lance being disposed in the upper portion of the furnace vertically movably along the axis of the furnace so as to blow off a combustion sustaining gas downward into the furnace, said upper tuyere being disposed at one or more stages in a furnace wall portion positioned between said wastes inlet and said gas outlet so that an angle at which the combustion sustaining gas is blown off is displaced from the furnace axis direction, and the lower tuyere being disposed at one or more stages in a furnace wall portion positioned between said wastes inlet and said molten slag/metal outlet and being projected into the furnace in a direction in which the combustion sustaining gas or both combustion sustaining gas and fuel are blown off toward the furnace axis.

2. A gasification and melting furnace for wastes according to claim 1, wherein said lower tuyere is projected 100 mm or more into the furnace.

3. A gasification and melting furnace for wastes according to claim 1, wherein a pool of molten slag and metal is provided behind said molten slag/metal outlet.

4. A gasification and melting furnace for wastes according to claim 3, wherein a device for monitoring a storage quantity of molten slag and metal is provided within said pool of molten slag and metal.

5. A gasification and melting furnace for wastes according to claim 3 or claim 4, wherein equipment for blowing off both combustion sustaining gas and fuel is provided in said pool of molten slag and metal.

6. A gasification and melting furnace for wastes according to claim 1, wherein the wall of the furnace is constructed of a refractory, and a device for cooling the back of the refractory is provided.

7. A gasification and melting furnace for wastes according to claim 1, wherein at least one of said furnace center lance, upper tuyere and lower tuyere is made of copper and has a water cooling structure, and an intra-furnace peep window is attached to the lower tuyere.

8. A gasification and melting furnace for wastes according to claim 1, wherein a lower end of the lower tuyere located at the lowest stage lies below an intermediate height position between an upper end position of said molten slag/metal outlet and a lower end position of said wastes inlet.

9. A gasification and melting furnace for wastes according to claim 1, wherein said position measuring device for measuring the position of an upper end surface of the introduced wastes comprises a pipe, a portion for blowing off a certain pressure of gas from a lower end of the pipe to the exterior of the pipe, a measuring instrument for measuring an internal pressure of the pipe, and a device for moving the pipe vertically.

10. A gasification and melting furnace for wastes according to claim 1, wherein said position measuring device for measuring the position of an upper end surface of the introduced wastes comprises a pipe, a portion for blowing off a certain pressure of gas from a lower end of the pipe to the exterior of the pipe, a large-diameter pipe connected to the lower end of said pipe, said large-diameter pipe having an inside diameter larger than that of said pipe and having an opening through which said gas can be discharged, a vertically movable top-shaped member supported by a lower end of said large-diameter pipe, said top-shaped member having an upper portion whose diameter is smaller than the inside diameter of the large-diameter pipe and larger than the inside diameter of said pipe and also having a lower portion whose diameter is smaller than the diameter of said upper portion, a measuring instrument for measuring an internal pressure of said pipe, and a device for moving said pipe vertically.

11. A gasification and melting furnace for wastes according to claim 1, further including, as equipment installed in front of said wastes inlet, at least one of drying equipment for drying wastes, removing equipment for removing metals and/or glasses from the wastes, and compacting equipment for compacting the wastes.

12. A gasification and melting furnace for wastes according to claim 11, wherein said removing equipment and said compacting equipment are disposed in this order.

13. A gasification and melting furnace for wastes according to claim 11, wherein said drying equipment, said removing equipment, and said compacting equipment are disposed in this order.

14. A gasification and melting furnace for wastes according to claim 1, further including gas cooling equipment for cooling discharged gas as equipment installed behind said gas outlet of the furnace.

15. A gasification and melting furnace for wastes according to claim 14, wherein said gas cooling equipment is a water spray cooling type equipment.

16. A gasification and melting furnace for wastes according to claim 14, further including a dust remover for separating dust from the discharged gas as equipment installed behind said gas cooling equipment.

17. A gasification and melting furnace for wastes according to claim 16, wherein said dust remover is a bag filter.

18. A gasification and melting furnace for wastes according to claim 16, further including a bypass pipe for connecting a gas outlet of said gas cooling equipment and a gas outlet of said dust remover with each other.

19. A gasification and melting furnace for wastes according to claim 16, further including, as equipment installed behind said dust remover, at least one of desulfurization equipment, denitrification equipment, and energy recovery equipment.

20. A gasification and melting furnace for wastes according to claim 19, further including connecting pipes for connecting said gas outlet of the furnace with said gas cooling equipment, said dust remover, said desulfurization equipment and said denitrification equipment, at least one of said connecting pipes having an expansion.

21. A gasification and melting furnace for wastes according to claim 16, wherein said dust remover is installed at two or more stages.

22. A gasification and melting furnace for wastes according to claim 16, wherein said dust remover has equipment for blowing off an adjuvant to a gas inlet of the dust remover.

23. A gasification and melting method for wastes using the gasification and melting furnace described in claim 1, which method comprises introducing wastes into the furnace from the wastes inlet, allowing an upper end of the introduced wastes to be formed at a position above an upper end of a tuyere located at the top stage of the lower tuyeres and below a lower end of the wastes inlet, blowing off a combustion sustaining gas into the furnace from the furnace center lance and the upper tuyeres, blowing off a combustion sustaining gas or both the combustion sustaining gas and fuel into the furnace from the lower tuyeres, allowing the introduced wastes to burn, holding the temperature of an upper end surface of the introduced wastes at 600° C. or higher, holding the temperature of a fire spot at which a main flow of the combustion sustaining gas blown off from the furnace center lance strikes against the wastes' surface, at 2000° C. or higher, holding the gas present above the wastes inlet in the furnace at a temperature in the range of 1000° C. to 1400° C. and discharging the gas from the gas outlet, and discharging molten slag which contains molten inorganic oxides and metals, as well as molten metals, from the molten slag/metal outlet.

24. A gasification and melting method for wastes according to claim 23, wherein oxygen 85% or more in purity is the combustion sustaining gas.

25. A gasification and melting method for wastes according to claim 23, wherein the ratio of the diameter, df, of the fire spot formed by the furnace center lance to the inside diameter, D, of the furnace is controlled so as to be df/D ≦0.6 by moving the furnace center lance vertically.

26. A gasification and melting method for wastes according to claim 23, wherein an average gas flowing velocity in a furnace portion higher than the wastes inlet is controlled to 1.0 m/s or less.

27. A gasification and melting method for wastes according to claim 23, wherein the basicity ($CaO/SiO_2$ mass ratio) in the resulting molten slag is adjusted to a value in the range of 0.6 to 1.2.

28. A gasification and melting method for wastes according to claim 27, wherein the basicity ($CaO/SiO_2$ mass ratio) in the resulting molten slag is adjusted by introducing a sub feedstock containing CaO and/or a sub feedstock containing $SiO_2$ into the furnace.

29. A gasification and melting method for wastes according to claim 23, wherein the bulk density of the wastes introduced into the gasification and melting furnace is greater than or equal to 0.3 $g/cm^3$.

30. A gasification and melting method for wastes according to claim 23, wherein the volume of each of the wastes introduced into the gasification and melting furnace is less than or equal to 0.03 $m^3$.

31. A gasification and melting method for wastes according to claim 23, wherein the wastes introduced into the gasification and melting furnace contains less than or equal to 30% of moisture in terms of mass %.

32. A gasification and melting method for wastes according to claim 23, wherein 50% or more, in terms of mass %, of metals contained in the wastes introduced into the gasification and melting furnace are removed in advance.

33. A gasification and melting method for wastes according to claim 23, wherein 50% or more, in terms of mass %, of glasses contained in the wastes introduced into the gasification and melting furnace are removed in advance.

34. A gasification and melting method according to claim 23, wherein discharged gas cooling equipment is installed behind the gas outlet of the gasification and melting furnace, and discharged gas is cooled to a temperature in the range of 120° C. to 200° C. within two seconds in said discharged gas cooling equipment.

35. A gasification and melting method according to claim 23, wherein dust recovered by a dust remover installed behind the gas outlet of the gasification and melting furnace is returned to the body of the furnace.

* * * * *